US012738385B2

(12) United States Patent
Jäderberg

(10) Patent No.: US 12,738,385 B2
(45) Date of Patent: Sep. 15, 2026

(54) MAGNETIC MIRROR MACHINE

(71) Applicant: Novatron Fusion Group AB, Spånga (SE)

(72) Inventor: Jan Jäderberg, Spånga (SE)

(73) Assignee: Novatron Fusion Group AB, Bromma (SE)

( * ) Notice: Subject to any disclaimer, the term of this patent is extended or adjusted under 35 U.S.C. 154(b) by 303 days.

(21) Appl. No.: 18/010,364

(22) PCT Filed: Nov. 11, 2021

(86) PCT No.: PCT/EP2021/081409

§ 371 (c)(1),
(2) Date: Dec. 14, 2022

(87) PCT Pub. No.: WO2022/101356

PCT Pub. Date: May 19, 2022

(65) Prior Publication Data

US 2024/0013932 A1 Jan. 11, 2024

(30) Foreign Application Priority Data

Nov. 11, 2020 (WO) ................. PCT/EP2020/081762

(51) Int. Cl.

*G21B 1/05* (2006.01)
*H05H 1/00* (2006.01)
*H05H 1/14* (2006.01)

(52) U.S. Cl.

CPC ................. *G21B 1/05* (2013.01); *H05H 1/00* (2013.01); *H05H 1/14* (2013.01)

(58) Field of Classification Search

None

See application file for complete search history.

(56) References Cited

U.S. PATENT DOCUMENTS 3,582,849 A * 6/1971 Post ........................ H01F 7/202 376/128
3,634,704 A * 1/1972 Stix ......................... H01J 27/18 310/11

(Continued)

FOREIGN PATENT DOCUMENTS

GB 2461267 A * 12/2009 ............... H05H 1/16
WO 8201457 A1 4/1982

(Continued)

OTHER PUBLICATIONS

International Search Report for International Application No. PCT/EP2021/081409, mailed Feb. 14, 2022, (3 pages).

(Continued)

*Primary Examiner* — Srinivas Sathiraju
(74) *Attorney, Agent, or Firm* — Kagan Binder, PLLC

(57) ABSTRACT

A magnetic mirror machine (2100; 2200; 3100; 3200) for plasma confinement comprises a plurality of longitudinally disposed superconductor coils (2104, 2105, 2106*a*, 2106*b*) arranged for producing an open-field-line plasma confinement area (2106), said plasma confinement area (2106) at each of two ends being limited by a respective mirror area (2108) of increased magnetic flux density relative to a central area (2110) of said plasma confinement area (2106), wherein a superconductor coil (2105, 2106*a*, 2106*b*) of said of plurality of superconductor coils is located adjacent to said mirror area (2108) and said superconductor coil (2105, 2106*a*, 2106*b*) of has a cross-section, in a plane intersecting a magnetic field line (2112) through said mirror area, having an elongate shape in a direction along said magnetic field line (2112).

10 Claims, 31 Drawing Sheets

(56) References Cited

U.S. PATENT DOCUMENTS

| | | | | | |
|---|---|---|---|---|---|
| 3,663,360 | A * | 5/1972 | Post | G21B 1/00 310/11 |
| 3,664,921 | A * | 5/1972 | Christofilos | H05H 1/22 376/127 |
| 3,668,065 | A * | 6/1972 | Moir | G21B 1/00 310/11 |
| 3,779,864 | A * | 12/1973 | Kaw | H05H 1/18 376/143 |
| 4,125,431 | A * | 11/1978 | Fowler | H05H 1/14 376/140 |
| 4,166,760 | A * | 9/1979 | Fowler | H05H 1/14 376/140 |
| 4,252,608 | A * | 2/1981 | Baldwin | G21B 1/05 376/127 |
| 4,735,762 | A * | 4/1988 | Lasche | H02K 44/08 976/DIG. 3 |
| H554 | H * | 12/1988 | Dawson | H05H 1/12 376/140 |
| 4,982,138 | A * | 1/1991 | Fujiwara | H01J 37/32678 118/723 MR |
| 5,082,827 | A * | 1/1992 | Barnes | G11B 5/6017 |
| 5,114,913 | A * | 5/1992 | Coufal | G11B 5/6005 360/122 |
| 5,779,802 | A * | 7/1998 | Borghs | H01J 37/32935 118/723 VE |
| 6,664,740 | B2 * | 12/2003 | Rostoker | H05H 1/14 315/111.41 |
| 8,624,502 | B2 * | 1/2014 | Rosenthal | H01J 27/18 315/111.41 |
| 9,659,736 | B2 * | 5/2017 | Rosenthal | H01J 37/08 |
| 9,928,926 | B2 * | 3/2018 | McGuire | H05H 1/14 |
| 9,928,927 | B2 * | 3/2018 | McGuire | H05H 1/14 |
| 9,934,876 | B2 * | 4/2018 | McGuire | H05H 1/14 |
| 9,947,420 | B2 * | 4/2018 | McGuire | H05H 1/14 |
| 10,966,310 | B1 * | 3/2021 | Forest | H05H 1/14 |
| 11,217,351 | B2 * | 1/2022 | Gonzalez | H05H 1/22 |
| 11,335,467 | B2 * | 5/2022 | Yang | G21B 1/052 |
| 11,948,696 | B2 * | 4/2024 | Horne | G21B 1/11 |
| 12,154,694 | B2 * | 11/2024 | Song | G21B 1/05 |
| 12,166,398 | B2 * | 12/2024 | Forest | H02K 44/10 |
| 2003/0234617 | A1 * | 12/2003 | Monkhorst | G21B 1/00 376/127 |
| 2005/0179394 | A1 * | 8/2005 | Rostoker | H05H 1/10 315/111.21 |
| 2005/0220245 | A1 * | 10/2005 | Rostoker | H05H 1/16 376/130 |
| 2006/0039519 | A1 * | 2/2006 | Rostoker | H05H 1/16 376/130 |
| 2010/0289409 | A1 * | 11/2010 | Rosenthal | H01J 27/18 315/111.81 |
| 2010/0290575 | A1 * | 11/2010 | Rosenthal | H01J 27/18 376/112 |
| 2015/0228438 | A1 * | 8/2015 | Rosenthal | H05H 1/02 376/112 |
| 2019/0141827 | A1 * | 5/2019 | Gonzalez | H05H 1/22 |
| 2019/0326023 | A1 * | 10/2019 | Yang | H05H 1/14 |
| 2019/0372449 | A1 * | 12/2019 | Mills | G21B 3/00 |
| 2020/0077507 | A1 * | 3/2020 | Radovinsky | H05H 13/00 |
| 2020/0111583 | A1 * | 4/2020 | Horne | H05H 1/11 |
| 2020/0357527 | A1 * | 11/2020 | Cohen | G21B 1/13 |
| 2022/0021290 | A1 * | 1/2022 | Mills | G21B 3/004 |
| 2022/0068510 | A1 * | 3/2022 | Gonzalez | G21B 1/13 |
| 2023/0298771 | A1 * | 9/2023 | Forest | F03H 1/0068 376/121 |
| 2023/0317304 | A1 * | 10/2023 | Gates | G21G 4/02 376/191 |
| 2023/0335302 | A1 * | 10/2023 | Gonzalez | H05H 1/22 |
| 2023/0345612 | A1 * | 10/2023 | Forest | H05H 1/18 |
| 2024/0013932 | A1 * | 1/2024 | Jäderberg | H05H 1/00 |
| 2025/0079964 | A1 * | 3/2025 | Forest | G21B 1/05 |

FOREIGN PATENT DOCUMENTS

| | | |
|---|---|---|
| WO | 2014204553 A2 | 12/2014 |
| WO | 2021094372 A1 | 5/2021 |

OTHER PUBLICATIONS

Furth, "The Energy Source: Nuclear Fusion Reactors," Applied Energy, vol. 47, pp. 147-167, 1994, (21 pages).

Korean Office Action, and English Translation therefore, for Korean Application No. 10-2022-7045094, mailed Aug. 27, 2024, (13 pages).

Japanese Office Action and English Translation for Japanese Application No. 2022-580093 mailed Feb. 10, 2026, 6 pages.

Indian Examination Report for Indian Application No. 202227070065, mailed Jun. 16, 2026, 7 pages.

* cited by examiner

MAGNETIC MIRROR MACHINE

CROSS-REFERENCE TO RELATED APPLICATIONS

This application claims priority to International Application No. PCT/EP2021/081409, filed Nov. 11, 2021 and titled "MAGNETIC MIRROR MACHINE," which in turn claims priority from an International Patent Application having serial number PCT/EP2020/081762, filed Nov. 11, 2020.

FIELD OF TECHNOLOGY

The present disclosure relates to a magnetic mirror machine for plasma confinement.

BACKGROUND

Great efforts are being made to design a reactor for controlled fusion on earth. The most promising fusion process is between the hydrogen isotopes deuterium ($^{2}H$) and tritium ($^{3}H$). In the deuterium-tritium fusion processes, a $^{4}He$ alpha particle, having a kinetic energy of about 3.5 MeV and a neutron, having a kinetic energy of about 14.1 MeV, are created.

For fusion to occur, nuclei must be in the form of a plasma having a temperature in the order of 150 million kelvins. Providing confinement for such a plasma remains a major challenge.

Plasma confinement involves confining the charged particles of the plasma. There are several different known magnetic configurations for plasma confinement. A well-known design is the magnetic mirror. Therein, particles follow magnetic field lines, typically running substantially longitudinally through the magnetic mirror machine, and are reflected in areas of increasing magnetic flux density at the respective ends of the device. In other words, the plasma confinement area of the magnetic mirror machine is at each of its two ends limited by a respective mirror area of increased magnetic flux density relative to a central area of the plasma confinement area.

Superconductor coils are well-known for being able to carry large electric currents, thereby, due to Ampere's law, being capable of generating large magnetic flux densities. Limiting factors in the design and use of a superconductor coil with respect to the maximum achievable usable magnetic flux density as generated by the coil include, firstly, the maximum electric current density possible in the superconductor material before breakdown of its superconducting properties, and, secondly, the maximum magnetic flux density possible in the superconductor material itself before breakdown of its superconducting properties.

Thus, there is a need to maximize the performance of a magnetic mirror machine given the above design constraints.

SUMMARY

It is an object of the present disclosure to solve, or at least mitigate, the above problem.

To this end, according to a first aspect, there is provided a magnetic mirror machine for plasma confinement, comprising a plurality of longitudinally disposed superconductor coils arranged for producing an open-field-line plasma confinement area, said plasma confinement area at each of two ends being limited by a respective mirror area of increased magnetic flux density relative to a central area of said plasma confinement area, wherein a superconductor coil of said of plurality of superconductor coils is located adjacent to said mirror area and said superconductor coil has a cross-section, in a plane intersecting a magnetic field line through said mirror area, having an elongate shape in a direction along said magnetic field line.

As the cross-section having an elongate shape should be understood as having an extension, in a first major direction of the cross-section, being at least twice, more preferably three times, even more preferably four times, and even more preferably five times an extension in a second major direction of the cross-section. An elongate shape should be understood as include, but not being limited to, a rectangular, elliptical, crescent-shaped, and/or tubular-segment-shaped cross-section. The first and second major directions may be orthogonal to each other, but the second direction may also be curved, i.e., having a curved shape with respect to the first direction, as would be the case with a tube-shaped cross section.

As a direction along the magnetic field line should be understood as a direction more parallel to the magnetic field line than perpendicular to the magnetic field line. In particular, the direction along the magnetic field line may be parallel or substantially parallel to the magnetic field line.

The present inventive concept stems from a realization that the arranging of the superconductor coil with an elongate cross-section in a direction along a magnetic field line in the mirror area may allow for maximizing the maximum magnetic flux density in the mirror areas of the magnetic mirror machine, given the design constraints of a maximum allowable magnetic flux density within the superconductor coil and a maximum coil current density.

In turn, a high magnetic flux density in the mirror areas may allow for a high mirror ratio in the magnetic mirror machine, i.e., a high ratio between the maximum magnetic flux density in a mirror area and the magnetic flux density in a central area of the magnetic mirror machine, which thereby may reduce the size of the loss cone and allow for better confinement of a plasma.

A high magnetic flux density in the mirror areas may allow for a high total magnetic flux in the magnetic mirror machine.

Thus, through the present inventive concept, there is provided a magnetic mirror machines comprising superconductor coils, maximizing the magnetic flux density in the mirror areas, given the design constraints of the superconducting coils.

Alternatively or additionally, the high magnetic flux density in the mirror areas may allow for a high product of magnetic flux density in and radius in the central area of the magnetic mirror machine.

A perimeter segment of said cross-sectional area directed towards said mirror area may convex as seen from outside said perimeter segment. Alternatively, or additionally, the perimeter segment may be curved in a same direction as a magnetic field line in the mirror area. This may allow for further maximizing of the maximum magnetic flux density in the mirror areas.

A perimeter segment of said cross-sectional area directed away from said mirror area may be concave as seen from outside said perimeter segment. Alternatively, or additionally, the perimeter segment may be curved in a same direction as a magnetic field line in the mirror area. This may allow for further maximizing of the maximum magnetic flux density in the mirror areas.

The perimeter segment of said cross-sectional area directed towards said mirror area runs may run parallel to the perimeter segment of said cross-sectional area directed away from said mirror area. This may allow for further maximizing of the maximum magnetic flux density in the mirror areas.

The plurality of superconductor coils may be disposed co-axially and longitudinally spaced and each arranged for carrying respective currents in a same direction. This is a particularly beneficial application of the present inventive concept.

The plurality of superconductor coils may comprise a first magnet system comprising a first plurality of concentrically arranged circular-loop superconductor coils, comprising a first superconductor coil arranged to carry a current in a first direction; and a second superconductor coil arranged to carry a current in a second direction opposite to said first direction; and a second magnet system comprising a second plurality of concentrically arranged circular-loop coils, arranged with mirror symmetry with respect to said first magnet system relative to a symmetry plane located between said first magnet system and said second magnet system. This is another particularly beneficial application of the present inventive concept.

The plurality of superconductor coils may further comprise a third magnet system arranged radially outside said plasma confinement area, said third magnet system comprising at least one superconductor circular-loop coil.

According to another aspect, there is provided a fusion reactor comprising the magnetic mirror machine of the first aspect. This aspect may generally present the same features and advantages as the first aspect.

According to another aspect, there is provided use of the magnetic mirror machine of the first aspect in a fusion reactor. This aspect may generally present the same features and advantages as the first aspect.

BRIEF DESCRIPTION OF THE DRAWINGS

The above, as well as additional objects, features and advantages of the present disclosure, will be better understood through the following illustrative and non-limiting detailed description of preferred embodiments, with reference to the appended drawings, where the same reference numerals will be used for similar elements, wherein.

DETAILED DESCRIPTION

As is generally known, plasma confinement devices may be based either on open magnetic field lines or closed field lines.

A closed-field-line configuration may, for example, be realized with a toroidal magnetic field. An example of such a device is a tokamak.

Open-field-line plasma confinement devices, as known in the prior art, may operate by a principle of magnetic mirroring, wherein the charged particles of the plasma are reflected in areas of increasing magnetic flux density at the respective ends of the confinement area.

While recognized to be able to provide plasma confinement, open-field-line plasma confinement devices will always have leakage of charge particles with velocity vectors sufficiently aligned with the magnetic field lines. More specifically, the mirror effect will occur for all particles within a range of angles of approach outside a loss cone defined by the helix spiral pitch angle of the charged particle's gyration spin around the magnetic field lines.

The extent of the loss cone is determined by the mirror ratio $r_{mirror}$, defined as the ratio between the maximum magnetic flux density at the mirror area $B_{mirror}$ and the minimum magnetic flux density $B_{central}$ in a central area of the magnetic mirror machine, following a magnetic field line:

$$r_{mirror} = \frac{B_{mirror}}{B_{central}}.$$

The angle defining the loss cone is then:

$$\alpha_{cone} = \arccos\frac{1}{\sqrt{r_{mirror}}}.$$

Thus, it can be seen that high mirror ratio will lead to a small loss cone, so that only the particle having velocities the most aligned with the field lines will escape. Conversely, a low mirror ratio will lead to a larger loss cone.

The superconductor coils throughout this disclosure may be manufactured and arranged using methods, materials, compounds, and the like, known per se in the art.

Suitable superconductor materials may include YBCO, Bi2223, 2212, Nb3SN, NbTi and/or MgB2.

The superconductor coils throughout this disclosure may, for example, be so-called high-temperature superconductor coils.

As known in the art, a superconductor coil may comprise internal structure. For example, within each superconductor coil, superconducting material may be arranged in filaments, strands, cables, ropes, or the like. using methods generally known in the art. The cross-section of the coil, as referred to throughout this disclosure, should then be understood as an enclosing envelope of this internal structure.

For example, the superconductor coils throughout this disclosure may be manufactured and arranged using methods, materials, compounds, and the like, as detailed in D Uglietti: A review of commercial high temperature superconducting materials for large magnets: from wires and tapes to cables and conductors, Supercond. Sci. Technol. 32 (2019) 053001 (29 pp), https://doi.org/10.1088/1361-6668/ab06a2, incorporated herein by reference.

Further, the superconductor coils may be cooled using methods generally known per se in the art.

Figure 18:
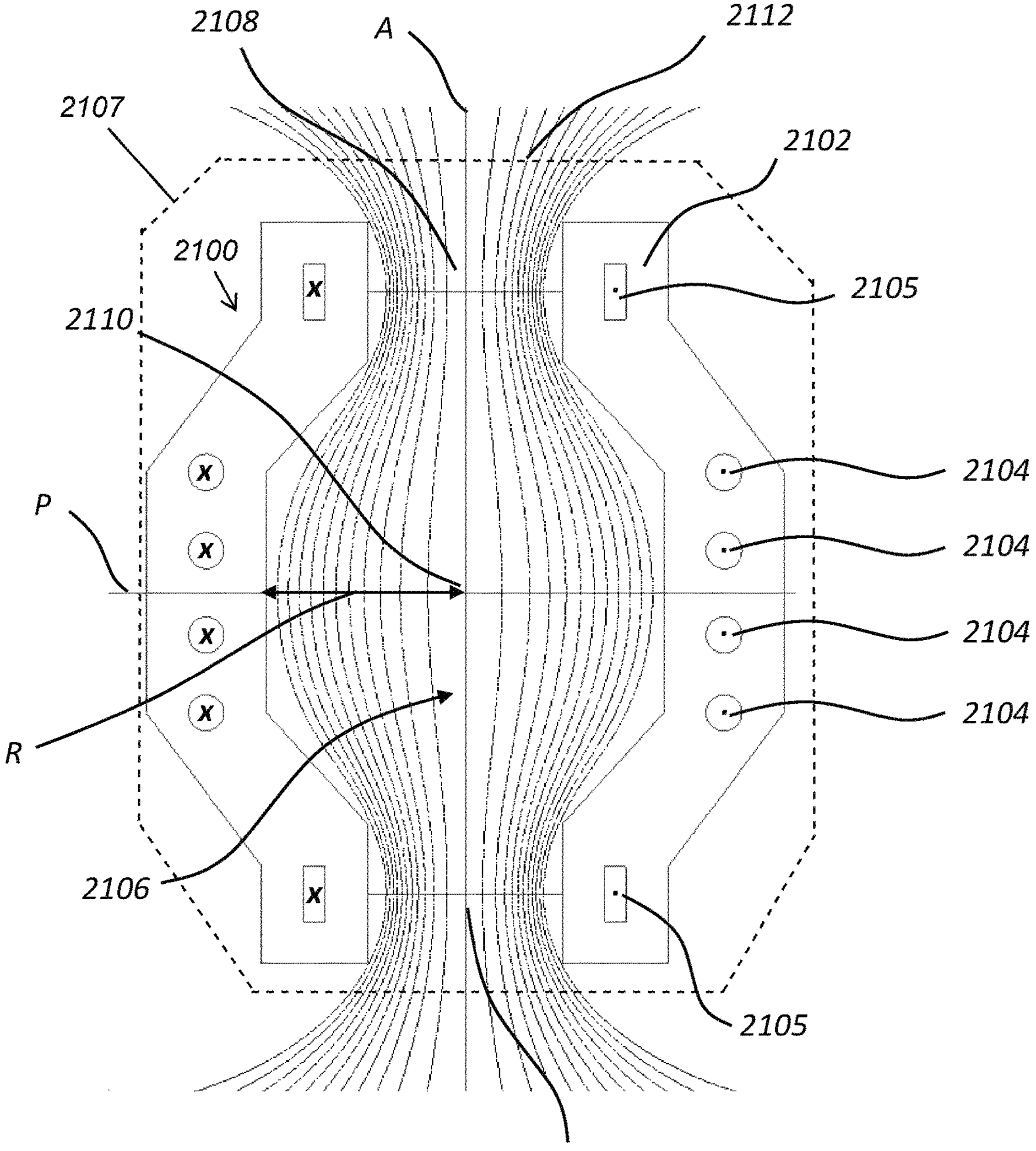
FIG. 18 is a schematic cross-sectional view of a fusion reactor incorporating a magnetic mirror machine.

FIG. 18 is a cross-sectional view of a fusion reactor 2107 incorporating a magnetic mirror machine 2100. The magnetic mirror machine 2100 is rotationally symmetric, or at least substantially rotationally symmetric, around a symmetry axis A. The fusion reactor 2107 is schematically shown in dashed lines to indicate that its precise configuration is schematic and not limiting. The fusion reactor 2107 may take any suitable form consistent with the various embodiments of the magnetic mirror machine 2100 described herein.

The magnetic mirror machine 2100 may be used for plasma confinement, and may comprise customary shielding 2102, for example neutron shielding 2102, as known in the art. In particular, the magnetic mirror machine 2100 may be comprised in a fusion reactor and/or used in a fusion reactor.

As evident from FIG. 18, the magnetic mirror machine 2100 comprises a plurality superconductor coils 104, 105, longitudinally-disposed along the symmetry axis A. Each superconductor coil 104, 105 may be arranged in a circular loop, as in FIG. 18, and may be arranged for carrying a direct current, for generating an open-field-line plasma confinement area 2106, as known per se in the art.

The plasma confinement area 2106 thus extends in a longitudinal direction of the magnetic mirror machine 2100, along the symmetry axis A, through the magnetic mirror machine 2100, with the magnetic field lines 2112 running along the longitudinal direction as well.

In the configuration of FIG. 18, as is evident from that figure, the plurality of superconductor coils 2104, 2105 are disposed co-axially, in the example of FIG. 18 with respect to the symmetry axis A. Further, the superconductor coils are longitudinally spaced with respect to the symmetry axis A. Further, as typical in a magnetic bottle arrangement, each superconductor coil is arranged for carrying respective currents in a same direction, as marked with dots and crosses in FIG. 18.

The plasma confinement area 2106 is at each of two ends limited by a respective mirror area 2108 of increased magnetic flux density relative to a central area 2110 of the plasma confinement area 2106, as is evident from the magnetic field line spacing in each mirror area 2108 and the central area 2110, and as known per se in the art.

A respective superconductor coil 2105 of the plurality of superconductor coils 2105, 2106 is located adjacent to each respective mirror area 2108. Indeed, in the example of FIG. 18, the respective superconductor coil 2105 is located radially outside the respective mirror area 2108.

As is evident from FIG. 18, the superconductor coil 2106 has a cross-section, in a plane intersecting a magnetic field line 2112 through said mirror area, thus corresponding to the plane of FIG. 18, having an elongate shape in a direction along the magnetic field line 2112.

Alternatively, as also evident from FIG. 18, this may be formulated as the superconductor coil 2106 has having a cross-section elongate in a longitudinal direction with respect to the magnetic mirror machine 2100 and/or the superconductor coil 2106 has having a cross-section elongate in a direction along the symmetry axis A.

Figure 2:
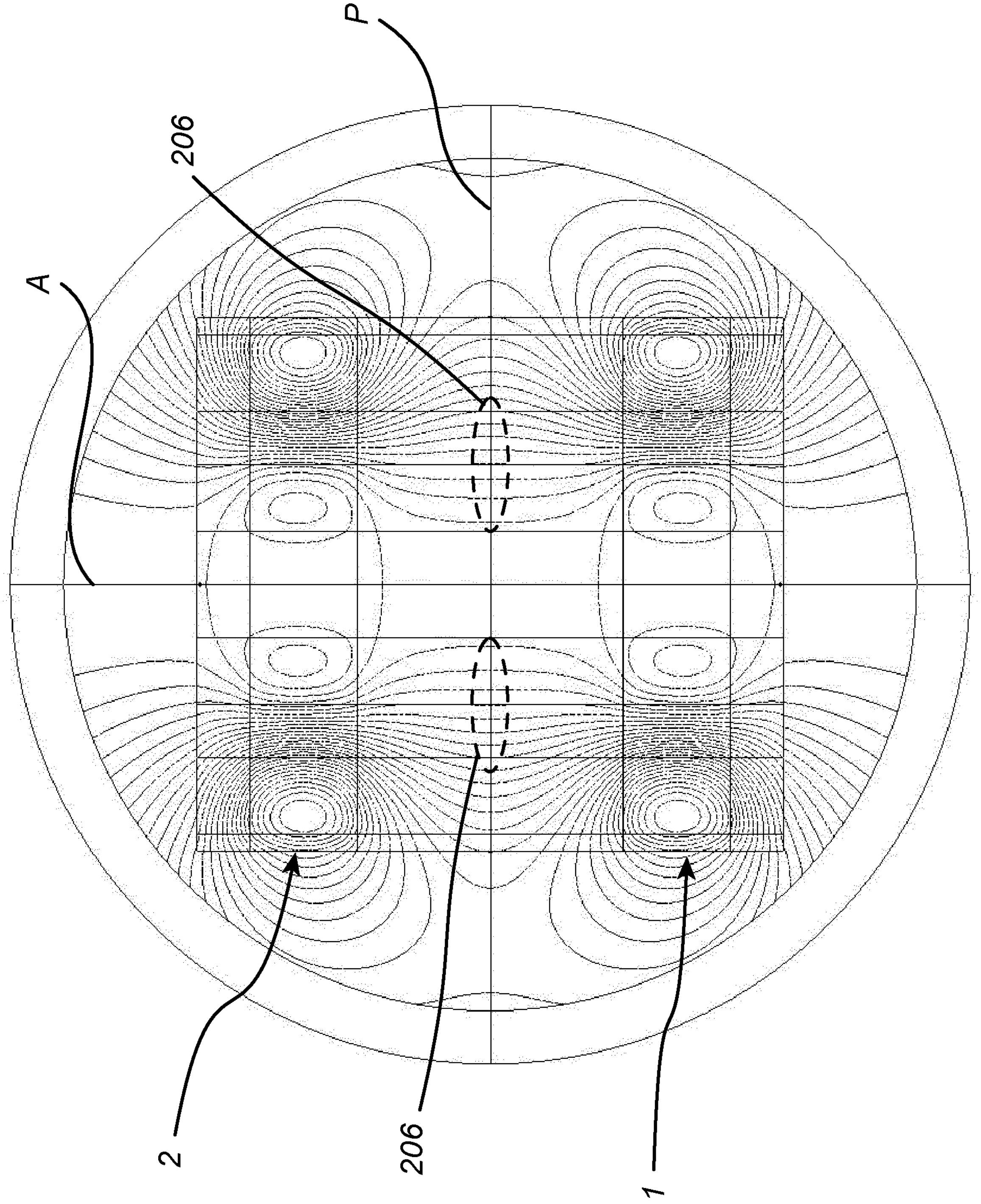
FIG. 2 is a planar view showing simulated magnetic field lines generated by the first and second magnet systems of FIGS. 1*a*, 1*b*, and 1*c*.

In the example of FIG. 2 the cross section is rectangular, having a dimension in the direction along the magnetic field line 2112 and/or the longitudinal direction of the magnetic mirror machine 2100 and/or the direction along the symmetry axis A about twice the size of a dimension perpendicular to that direction, i.e., radially in the magnetic mirror machine 2100.

Figure 19:
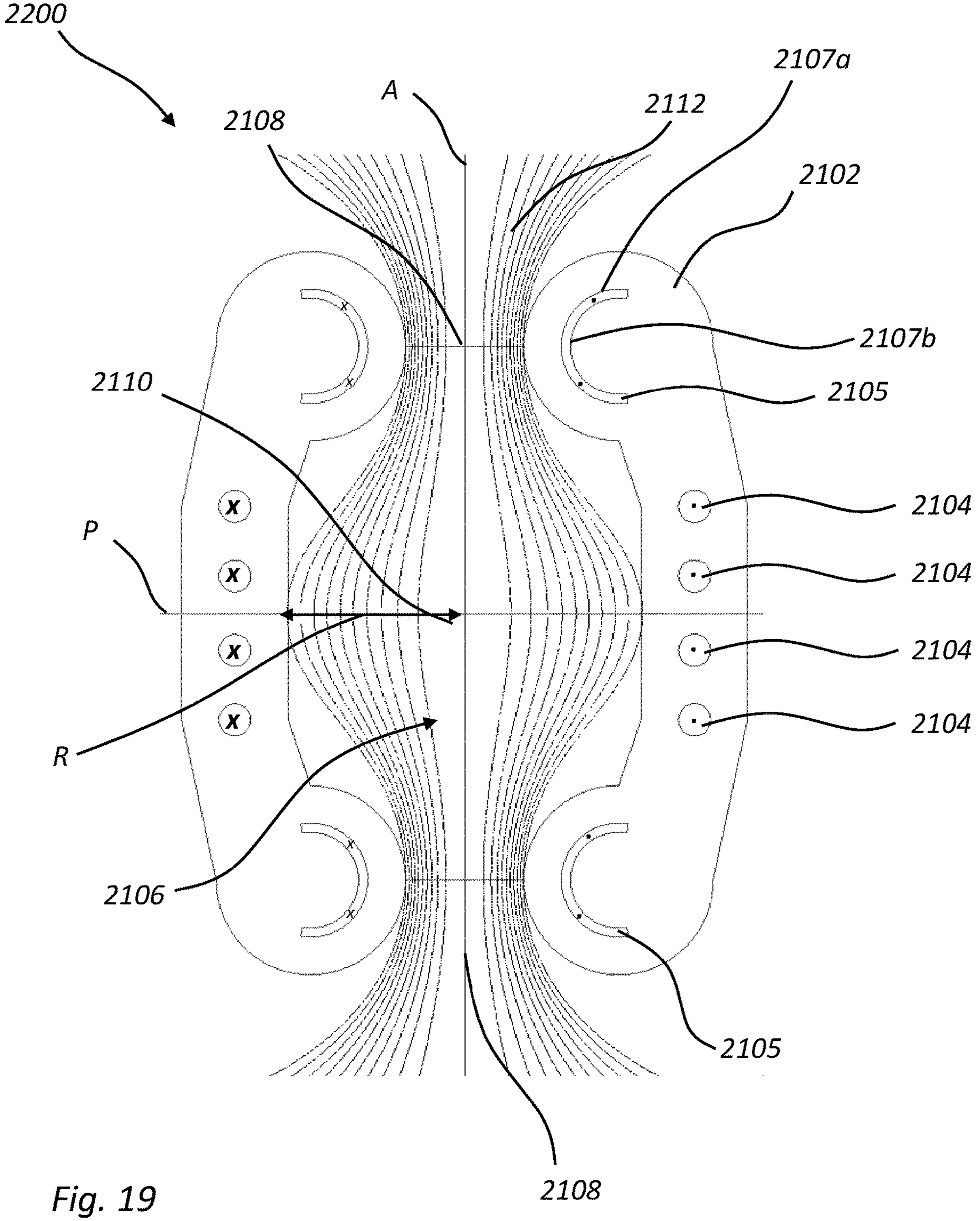
FIGS. 19; 20; 21A, 21B; 22A, 22B; 23A, and 23B are further cross-sectional views of respective magnetic mirror machines.

FIG. 19 shows a further magnetic mirror machine 2200. The magnetic mirror machine 2200 has the same features as the magnetic mirror machine 2100 of FIG. 1, with an exception that each of the superconductor coils 2206 adjacent to each respective mirror area 108 has a tubular-segment-like cross section, i.e., having a general shape of a circular segment as if formed from part of a tube.

Thus, the cross section of each superconductor coil 2105 is such that a perimeter segment 2307*a* of the cross-sectional area directed towards the mirror area 2108 is convex as seen from outside the perimeter segment 2307*a*.

Moreover, a perimeter segment 2307*b* of the cross-sectional area of each superconductor coil 2306 directed away from the mirror area is concave as seen from outside the perimeter segment 2307*b*.

Naturally, other curved cross sections are equally possible, not necessarily following a circular segment path, with convex and concave perimeter segments, as per the previous two paragraphs.

Further, in the example of FIG. 19, the perimeter segment 2307*a* of the cross-sectional area directed towards the mirror area 2108 runs parallel to the perimeter segment 2307*b* of the cross-sectional area directed away from the mirror area.

Figure 20:
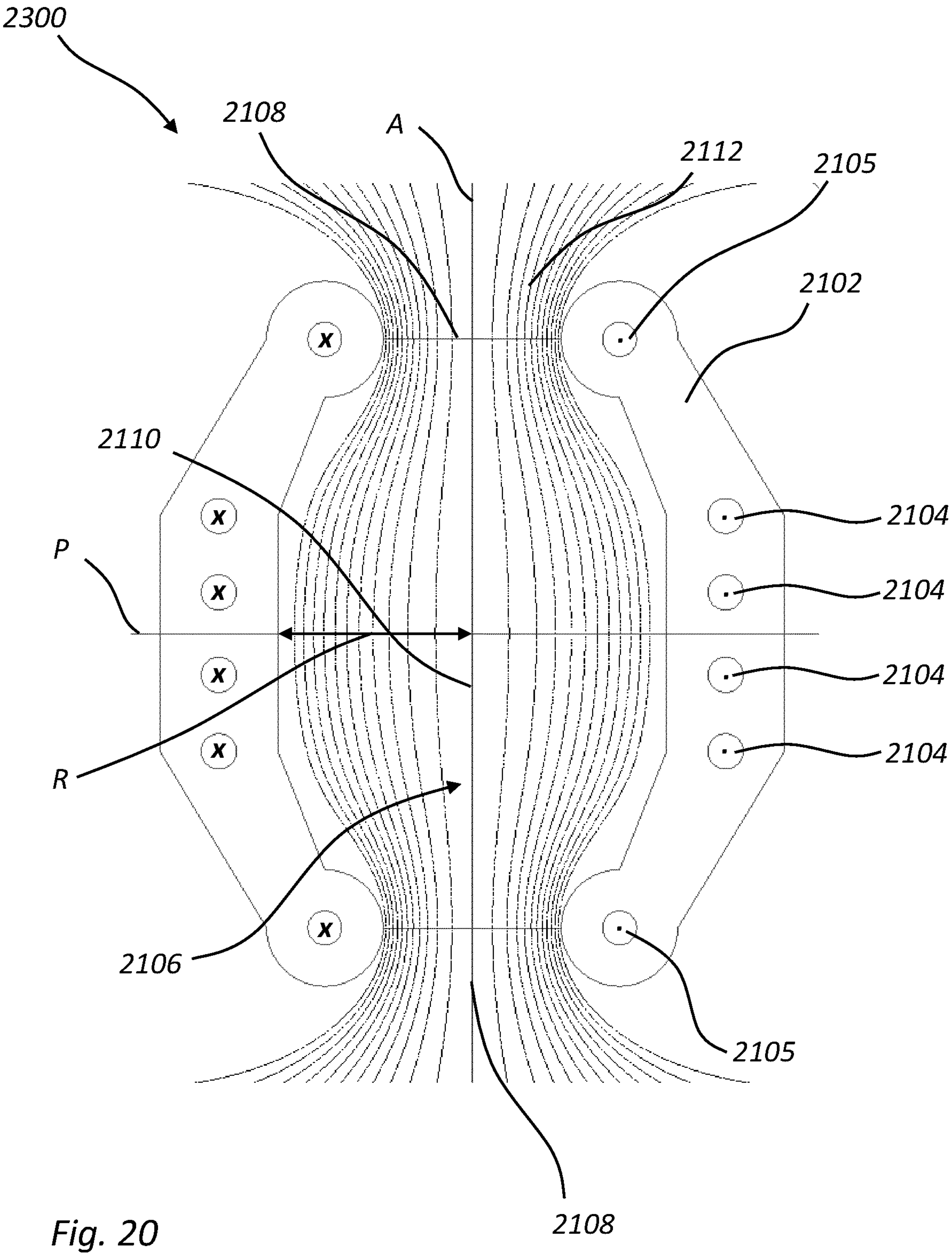

FIG. 20 shows a further magnetic mirror machine 2300, not according to the present inventive concept, but presented as an example useful for understanding the present inventive concept. The magnetic mirror machine 2300 has the same features as the magnetic mirror machine 2100 of FIG. 1, with an exception that each of the superconductor coils 2406 adjacent to each respective mirror area 2108 has a circular cross section, i.e., not being elongate.

Magnetic field simulations were performed to evaluate the designs of the magnetic mirror machine 2100 of FIG. 18, the magnetic mirror machine 2200 of FIG. 19, the magnetic mirror machine 2300 of FIG. 20.

Table 1 shows results of the simulations, wherein:

$B_{coil}$ is the maximum magnetic flux density within each coil 2105, adjacent to the mirror area 2108, $B_{mirror}$ is the maximum magnetic flux in the mirror area 2108, $B_{central,\ outer}$ is the magnetic flux density at the symmetry plane P, at an radially outermost edge of the central area 110, $B_{central,\ avg}$ is the magnetic flux density at the symmetry plane P, radially averaged through the central area 110, and R is the inner radius of the magnetic mirror machine 2100, 2200, 2400, the final line of Table 1 thus showing the product of $B_{central,\ avg}$ and R.

TABLE 1

| Machine | 2300 (FIG. 20) | 2100 (FIG. 18) | 2200 (FIG. 19) |
|---|---|---|---|
| $B_{coil}$ (T) | 23.0 | 23.1 | 23.1 |
| $B_{mirror}$ (T) | 7.67 | 10.41 | 15.6 |
| $B_{coil}/B_{mirror}$ | 3.00 | 2.22 | 1.48 |
| $B_{central,\ outer}$ (T) | 1.90 | 1.89 | 2.08 |
| $B_{mirror}/B_{central,\ outer}$ | 4.03 | 5.5 | 7.50 |
| $B_{central,\ avg} \times R$ | 6.0 | 6.0 | 6.0 |

The simulations were performed using a wall 2102 thickness of 700 mm, an initial magnetic mirror machine inner radius R at the symmetry plane P of 3 300 mm, and a distance between the symmetry plane P and the coils 2105 of 5 000 mm.

The simulations were performed assuming a constant current density within each superconductor coil and with a constraint that the maximum magnetic flux density within each coil 2105 adjacent to the mirror area 2108 must not exceed approximately 23 T, being a typical value for a breakdown magnetic flux density for the respective superconductor coil.

Further, the radius of each magnetic mirror machine was varied so that the product $B_{central,\ avg} \times R$ of the average magnetic flux density $B_{central,\ avg}$ at the symmetry plane P and the inner radius R of the magnetic mirror machine, the latter thus roughly corresponding to the radius of the plasma confinement area 1206 at the symmetry plane P, was fixed at 6.0 T m.

In the results of Table 1, reflecting the above-mentioned design constraint, $B_{coil}$ is in each case is close to 23 T. It should be noted that due to the linear nature of magnetic fields, the present results may be readily be scaled to other coil maximum magnetic flux densities than 23 T, for which the results are equally valid.

As can be seen from Table 1, the elongate coil cross section in the magnetic mirror machine 2200 allows for a higher magnetic flux density $B_{mirror}$ in the mirror area, given the constraint of not exceeding a magnetic flux density of approximately 23 T in the coil, as compared to the circular non-elongate coil 2105 of the magnetic mirror machine 2300 of FIG. 20. Further, the tubular-segment cross section of the coil 2105 of the magnetic mirror machine 2400 of FIG. 20 allows for a yet higher $B_{mirror}$, as compared to FIGS. 19 and 18.

The magnetic flux density $B_{central,\ outer}$ of the central area remains roughly constant in each magnetic mirror machine. Thus, the increased $B_{mirror}$ in FIGS. 18 and 19 as compared to FIG. 20 may translate into an increased mirror ratio $B_{mirror}/B_{central,\ outer}$ of the magnetic mirror machine, given the fixed product $B_{central,\ avg} \times R$.

The present inventive concept is equally applicable to a magnetic mirror machine wherein the plurality of superconductor coils comprises a first magnet system comprising a first plurality of concentrically arranged circular-loop superconductor coils, comprising a first superconductor coil arranged to carry a current in a first direction; and a second superconductor coil arranged to carry a current in a second direction opposite to the first direction; and a second magnet system comprising a second plurality of concentrically arranged circular-loop coils, arranged with mirror symmetry with respect to the first magnet system relative to a symmetry plane located between the first magnet system and the second magnet system, the concept of and advantages of which being discussed in detail elsewhere in this disclosure.

Figure 21A:
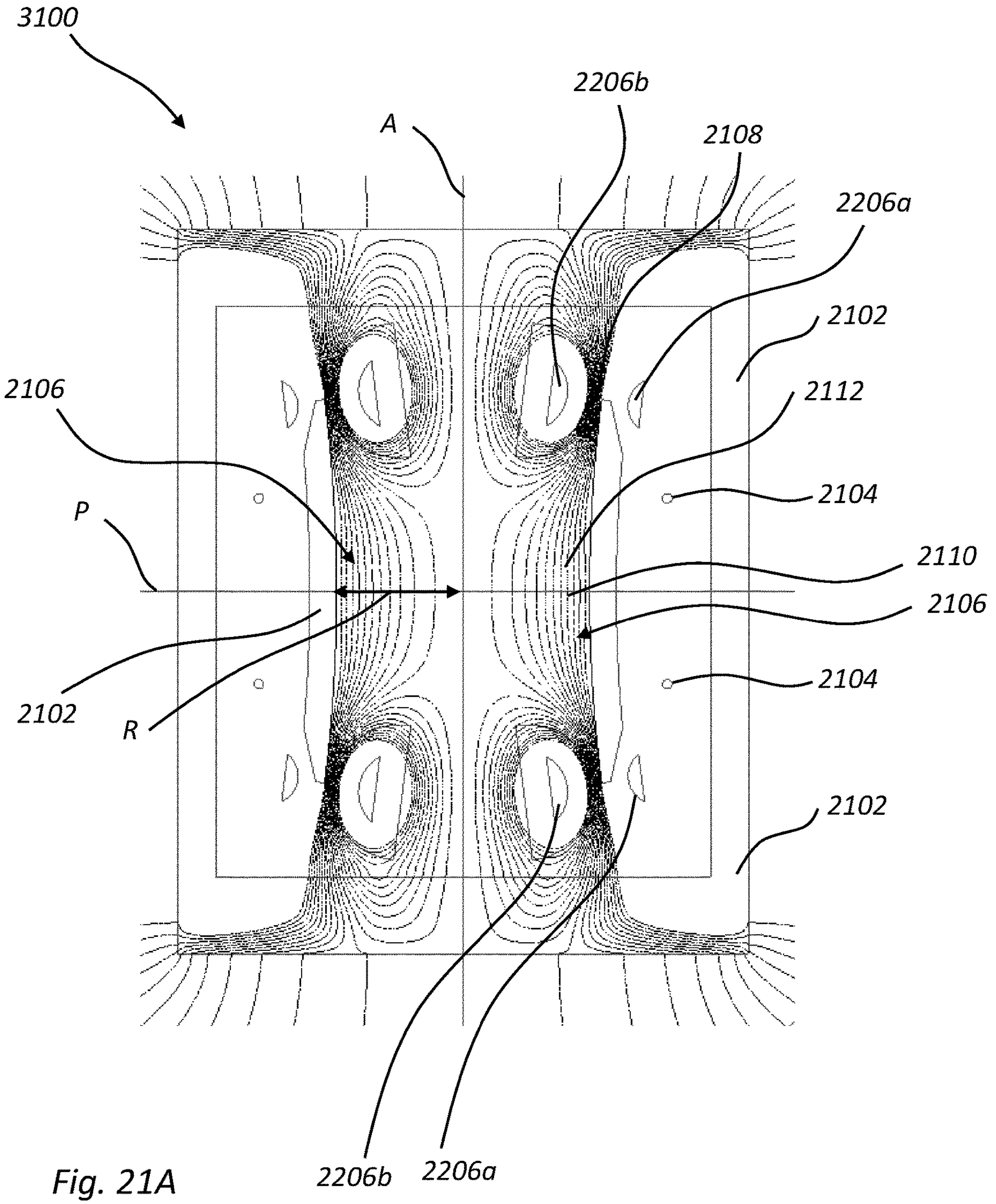
Figure 21B:
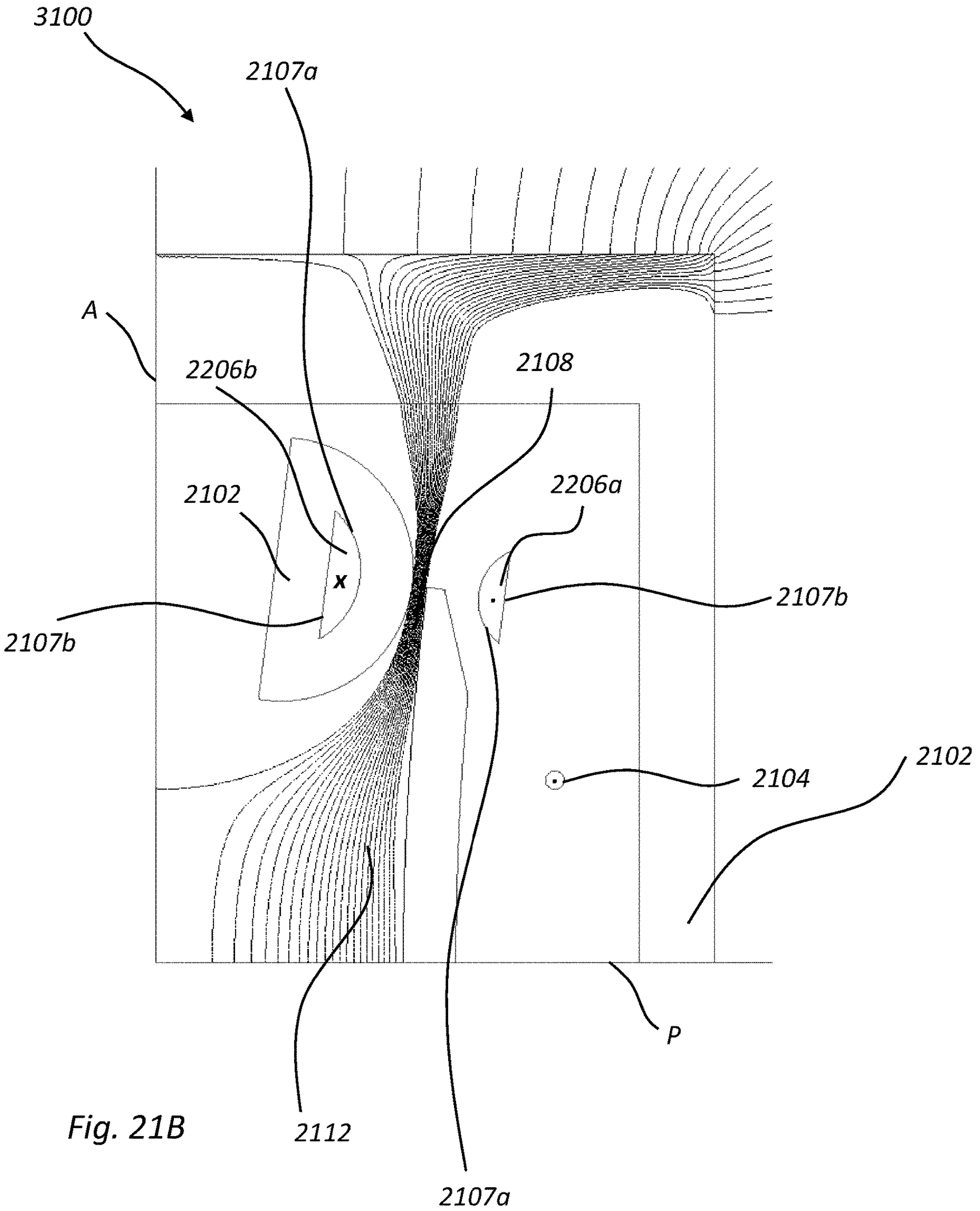

FIGS. 21A and 21B show such a magnetic mirror machine 3100, wherein FIG. 21A is a cross-sectional view of the magnetic mirror machine 2200, and FIG. 21B is a close-up of a single quadrant of FIG. 21A, which due to rotational and mirror symmetry is representative of all four quadrants of the cross section shown in FIG. 21A.

The magnetic mirror machine 3100 is rotationally symmetric, or at least substantially rotationally symmetric, around a symmetry axis A.

The magnetic mirror machine 3100 may be used for plasma confinement, and may comprise customary shielding 2102, for example neutron shielding 2102, as known in the art. In particular, the magnetic mirror machine 2100 may be comprised in a fusion reactor and/or used in a fusion reactor.

As evident from FIG. 21A, the magnetic mirror machine 3100 comprises a plurality of superconductor coils 2204, 2206*a*, 2206*b*, longitudinally-disposed along the symmetry axis A. Each superconductor coil 2204, 2206*a*, 2206*b* may be arranged in a circular loop, as in FIGS. 21A/21B, and may be arranged for each carrying a direct current arranged for producing an open-field-line plasma confinement area 2106.

The plasma confinement area 2106 thus extends in a longitudinal direction, along the symmetry axis A, through the magnetic mirror machine 3100, with the magnetic field lines 2112 in the plasma confinement area 2106 running in the longitudinal direction as well.

In particular, superconductor coils 2206*a* and 2206*b* located above the symmetry plane P constitute a first magnet system, wherein the coil 2206*a* is arranged to carry a direct current in a first direction and the coil 2206*b* is arranged to carry a direct current in a second, opposite, direction, as indicated with dots and crosses in FIG. 21B.

Further, the superconductor coils 2206*a* and 2206*b* located below the symmetry plane P constitute a second magnet system, arranged with mirror symmetry with respect to the first magnet system relative to the symmetry plane P, which thus is located between the first magnet system and the second magnet system.

Through such an arrangement, an annular confinement area 2106 may be created, as detailed elsewhere in this disclosure.

Further, a third magnet system comprising at least one superconductor coil, typically a plurality of superconductor coils, and in the example of FIGS. 21A and 21B two superconductor coils 2104, may be arranged radially outside the plasma confinement area 2106.

The plasma confinement area 2106 is at each of two ends limited by a respective mirror area 2108 of increased magnetic flux density relative to a central area 2110 of the plasma confinement area 2106, as is evident from the magnetic field line spacing in each mirror area 2108 and the central area 2110.

The superconductor coils 2206*a*, 2206*b* of the first magnet system and of the second magnet system are located adjacent to the respective mirror area 2108. In the example of FIGS. 21A and 21B, the superconductor coils 2206*a* are located radially outside the respective mirror area 2108 and the superconductor coils 2206*b* are located radially inside the respective mirror area 2206*a*.

As is evident from FIGS. 21A and 21B each superconductor coil 2206_a_, 2206_b_ of the first magnet system and of the second magnet system has a cross-section, in a plane intersecting a magnetic field line 2112 through said mirror area, thus corresponding to the plane of FIGS. 21A/21B, having an elongate shape in a direction along the magnetic field line 2112. In the example of FIGS. 21A and 21B the cross section is crescent shaped, having a dimension in the direction along the magnetic field line 2112 about twice the size of a dimension perpendicular to that direction.

Thus, each of the superconductor coils 2206_a_, 2206_b_ adjacent to each respective mirror area 2108 has a crescent-shaped cross section. In particular, the cross section of each superconductor coil is such that a perimeter segment 2207_a_ of the cross-sectional area directed towards the mirror area 2108 is convex as seen from outside the perimeter segment 2207_a_.

Alternatively, as also evident from FIGS. 21A and 21B, this may be formulated as the superconductor coil 2206_a_, 2206_b_ having a cross-section elongate in a longitudinal direction with respect to the magnetic mirror machine 3100 and/or the superconductor coil 2206_a_, 2206_b_ having a cross-section elongate in a direction along the symmetry axis A.

Further, as shown in the example of FIGS. 21A and 21B, the perimeter segments 2207_b_ directed away from the mirror area 2108 may be flat.

Other elongate cross sections, such as a rectangular one as in FIG. 18 are equally possible.

Figure 22A:
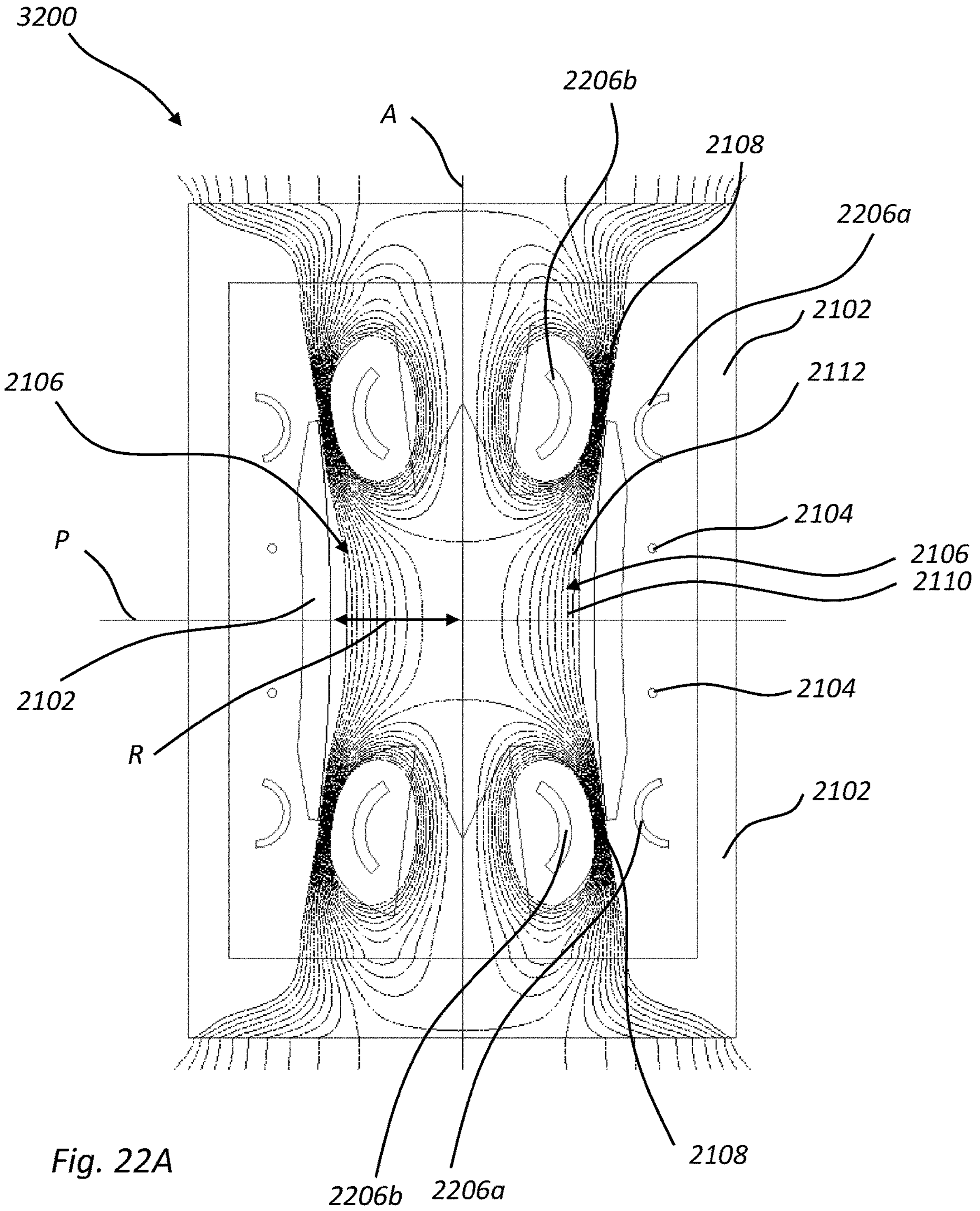
Figure 22B:
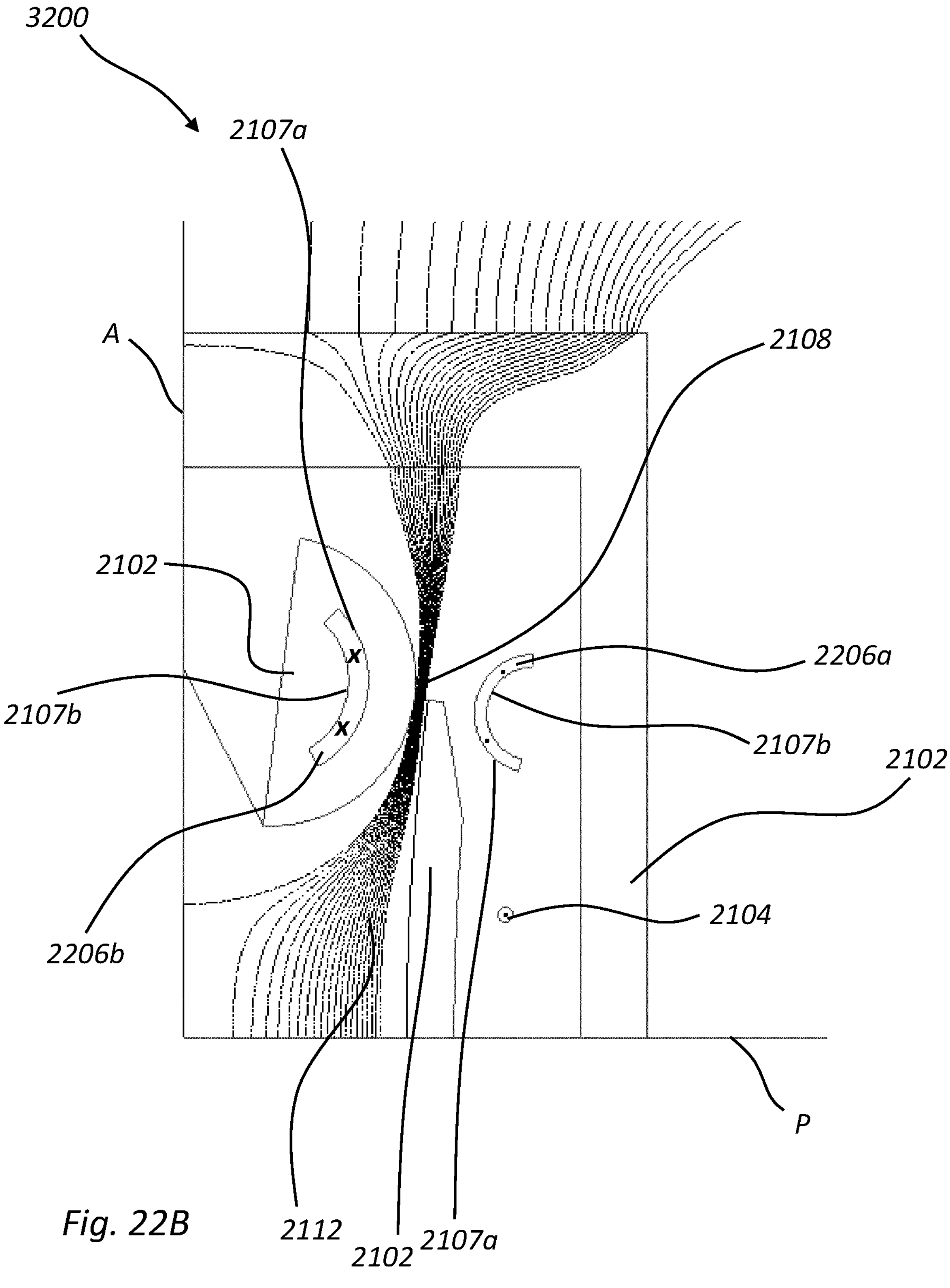

FIGS. 22A and 22B show a further magnetic mirror machine 3200.

The magnetic mirror machine 3200 has the same features as the magnetic mirror machine 3100 of FIG. 1, with an exception that each of the superconductor coils 2206 adjacent to each respective mirror area 108 has a tubular-segment-like cross section, i.e., having a general shape of a circular segment as if formed from part of a tube. Naturally, other curved cross sections are equally possible, not necessarily following a circular segment path.

Thus, the cross section of each superconductor coil is such that a perimeter segment 2207_a_ of the cross-sectional area directed towards the mirror area 2108 is convex as seen from outside the perimeter segment 2207_a_.

Moreover, a perimeter segment 2207_b_ of the cross-sectional area of each superconductor coil 2306 directed away from the mirror area is concave as seen from outside the perimeter segment 2207_b_.

Naturally, other curved cross sections are equally possible, not necessarily following a circular segment path, with convex and concave perimeter segments, as per the previous two paragraphs.

Further, in the example of FIGS. 22A and 22B, the perimeter segment 2207_a_ of the cross-sectional area directed towards the mirror area 2108 runs parallel to the perimeter segment 2207_b_ of the cross-sectional area directed away from the mirror area.

Figure 23A:
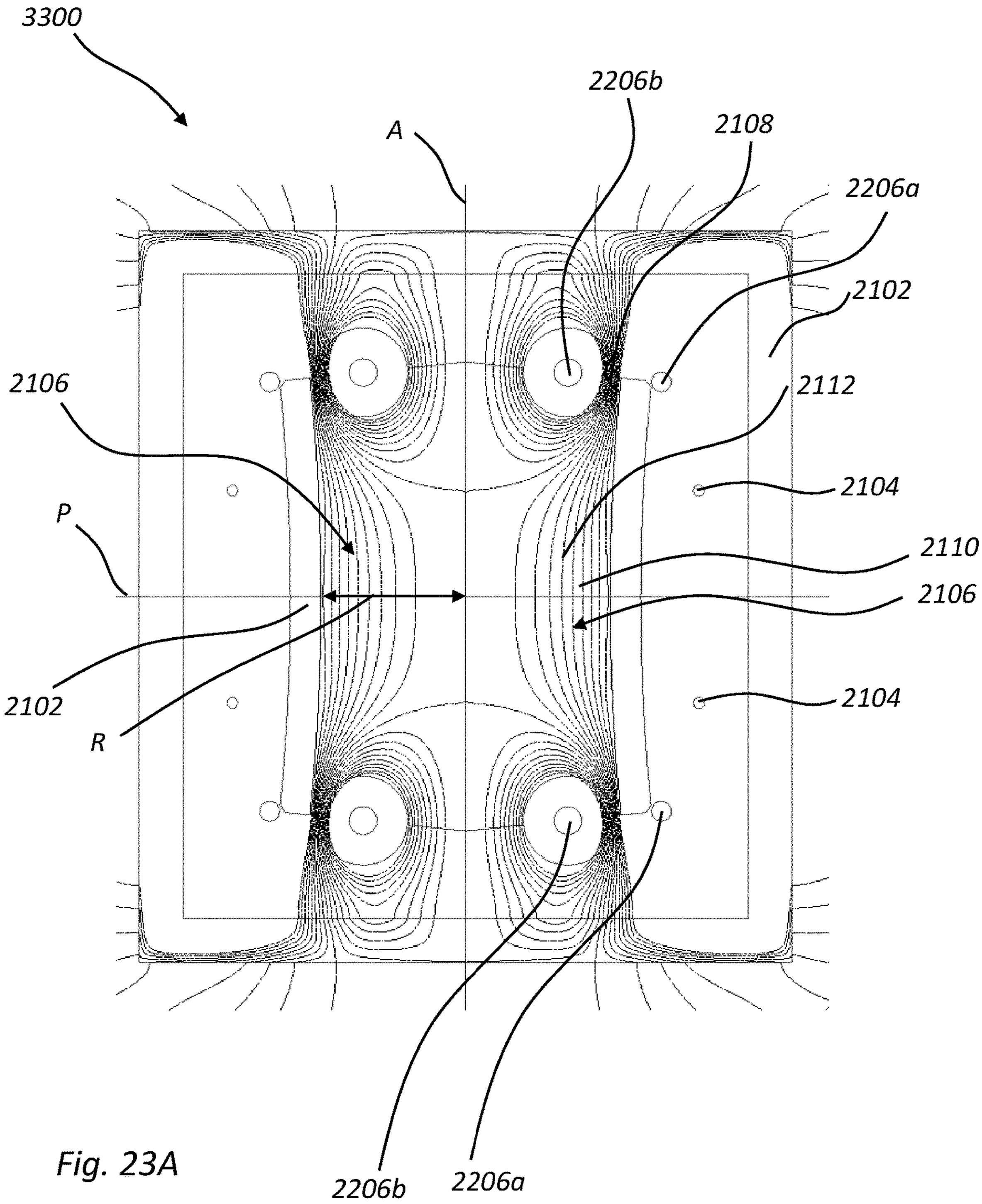
Figure 23B:
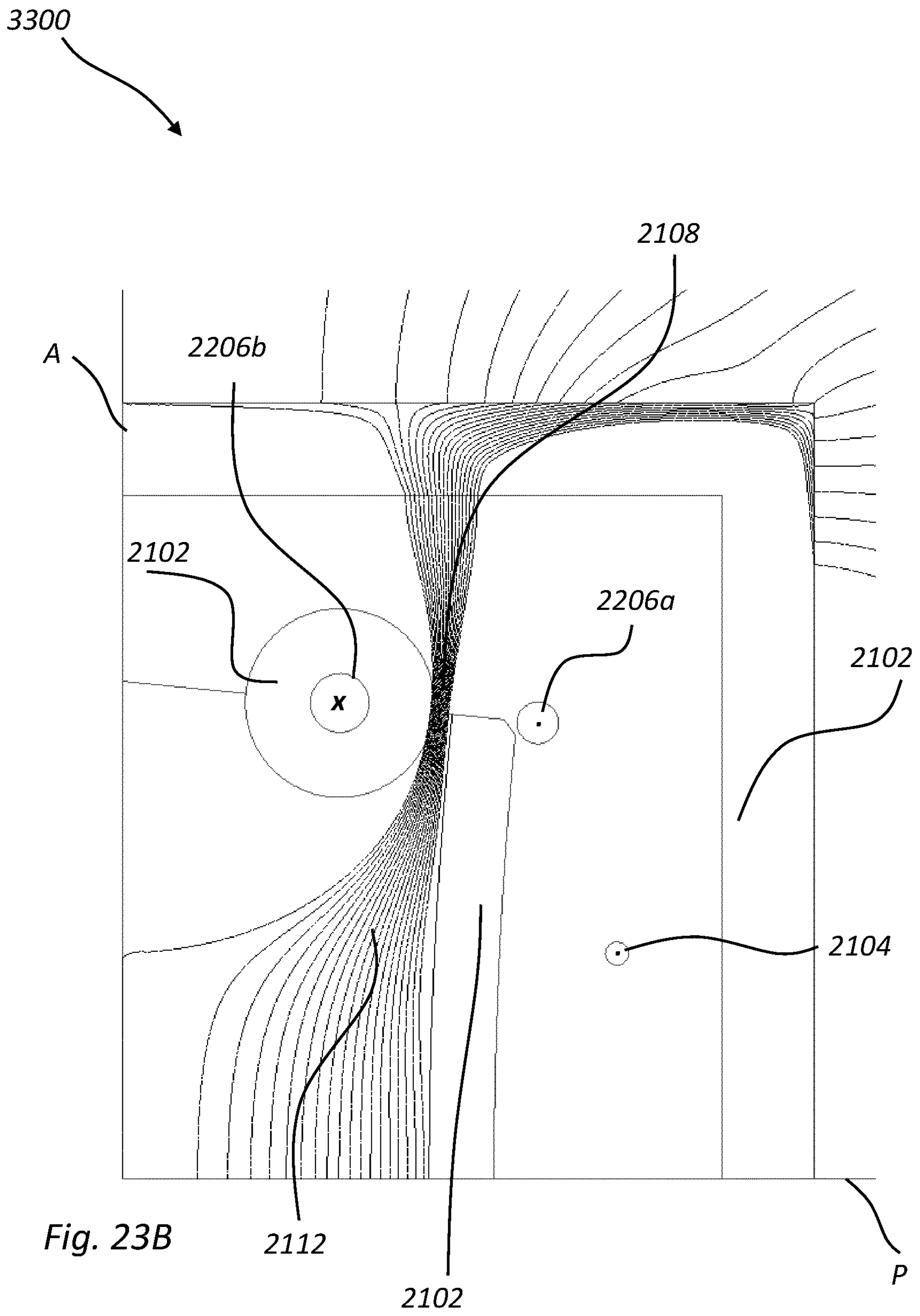

FIGS. 23A and 23B shows a further magnetic mirror machine 2400, not according to the present inventive concept, but presented as an example useful for understanding the present inventive concept. The magnetic mirror machine 4200 has the same features as the magnetic mirror machine 2100 of FIGS. 21A and 21B, with an exception that each of the superconductor coils 2206_a_, 2206_b_ adjacent to each respective mirror area 2108 has a circular cross section, i.e., the cross section being non-elongate.

Magnetic field simulations were performed to evaluate the designs of the magnetic mirror machine 3100 of FIGS. 21A and 21B, the magnetic mirror machine 3200 of FIGS. 22A and 22B, and the magnetic mirror machine 3300 of FIGS. 23A and 23B.

Table 2 shows results of the simulations, wherein:

$B_{coil}$ is the maximum magnetic flux density within each coil 2206_a_, 2206_b_ adjacent to the mirror area 2108, $B_{mirror}$ is the maximum magnetic flux in the mirror area 2108, $B_{central,\ outer}$ is the maximum magnetic flux density at the symmetry plane P, i.e., in the central area 110, and R is the inner radius of the magnetic mirror machine 3100, 3200, 3300, the final line of Table 1 thus showing the product of $B_{central,\ avg}$ and R.

TABLE 2

| Machine | 3300 (FIGS. 23A/23B) | 3100 (FIGS. 21A/21B) | 3200 (FIGS. 22A/22B) |
|---|---|---|---|
| $B_{coil}$ (T) | 23.0 | 23.0 | 23.0 |
| $B_{mirror}$ (T) | 8.12 | 14.05 | 15.30 |
| $B_{coil}/B_{mirror}$ | 2.83 | 1.66 | 1.50 |
| $B_{central,\ outer}$ (T) | 1.12 | 1.82 | 2.01 |
| $B_{mirror}/B_{central,\ outer}$ | 7.28 | 7.77 | 7.66 |
| $B_{central,\ avg} \times R$ | 3.40 | 5.58 | 6.31 |

The simulations were performed using a wall 2102 thickness of 700 mm, a magnetic mirror machine inner radius R at the symmetry plane P of 3 300 mm, and a distance between the symmetry plane P and the coils 2206_a_, 2206_b_ of 5 000 mm.

The simulations were performed assuming a constant current density within the superconductor coil and with a constraint that the maximum magnetic flux density within each coil 2105 adjacent to the mirror area 2108 must not exceed approximately 23 T, being a typical value for a breakdown magnetic flux density for the respective superconductor coil.

Further, the radius of each magnetic mirror machine was varied so that the ratio $B_{coil}/B_{mirror}$ was maximized, being equivalent to maximizing $B_{mirror}$ due to the constant $B_{coil}$.

In the results of Table 2, reflecting the above design constraint, $B_{coil}$ is in each case 23.0 T. It should be noted that due to the linear nature of magnetic fields, the present results may be readily be scaled to other coil maximum magnetic flux densities than 23.0 T, for which the results are equally valid.

As can be seen from Table 2, the elongate crescent-shaped coil cross sections in the magnetic mirror machine 3100 allow for a higher magnetic flux density $B_{mirror}$ in the mirror area, given the constraint of not exceeding a magnetic flux density of approximately 23 T in the coil, as compared to the circular non-elongate coil 2206_a_, 2206_b_ of the magnetic mirror machine 3300 of FIGS. 23A/23B. Further, the tubular-segment cross section of the coils 2206_a_, 2206_b_ of the magnetic mirror machine 3200 of FIGS. 22A and 22B allows for a yet higher $B_{mirror}$, as compared to FIGS. 23A/23B and 21A/21B.

Thus, in the present optimization, the magnetic flux density $B_{central,\ outer}$ of the central area remains around 7-8 T, while the elongate and tubular segment cross-sections allow for a considerably increased product $B_{central,\ avg}$ R.

The inventive concept has mainly been described above with reference to example embodiments. However, as is readily appreciated by a person skilled in the art, other embodiments than the ones disclosed above are equally possible within the scope of the inventive concept, as defined by the appended patent claims. In particular, other elongate cross-sections than those specifically discussed herein are equally possible, within the scope of the claims. In particular, crescent-like cross sections such as the one of FIGS. 21A and 21B are equally applicable to, e.g., the bottle-type magnetic mirror machines, such as the one of FIG. 18 and rectangular cross sections such as the one of FIG. 18 are equally applicable to the magnetic mirror machine of, e.g., FIGS. 21A and 21B.

The remainder of this disclosure relates to a plasma confinement device and to a method for plasma confinement.

Great efforts are being made to design a reactor for controlled fusion on earth. The most promising fusion process is between the hydrogen isotopes deuterium ($^2$H) and tritium ($^3$H). In the deuterium-tritium fusion processes, a $^4$He alpha particle, having a kinetic energy of about 3.5 MeV and a neutron, having a kinetic energy of about 14.1 MeV, are created.

For fusion to occur, nuclei must be in the form of a plasma having a temperature in the order of 150 million kelvins. Providing confinement for such a plasma remains a major challenge.

There are several different known magnetic configurations for plasma confinement.

Plasma confinement involves confining the charged particles of the plasma. Further, various properties beneficial to the stability of the confined plasma may be desirable.

A well-known design is the magnetic mirror. Therein, particles follow magnetic field lines and are reflected in areas of increasing magnetic flux density at the respective ends of the device. While capable of plasma confinement, as has been demonstrated experimentally, it is associated with various plasma instability problems. To solve these problems, various convoluted non-rotationally symmetric geometries have been proposed in the prior art, such as the "Minimum B" design, resembling a tennis ball, or the "Biconic Cusp".

Another well-known design is the tokamak. The tokamak uses a toroidal, i.e., donut-shaped, field for confinement. The tokamak, too, is associated with various plasma stability problems, such as charge separation.

It is an object of the present disclosure to provide an improved plasma confinement device and method, in particular for use in fusion reactors.

To this end, according to a first aspect, there is provided a plasma confinement device, comprising a first magnet system, comprising a first plurality of concentrically arranged circular-loop coils, comprising a first coil arranged to carry a current in a first direction, and a second coil arranged to carry a current in a second direction opposite to the first direction; and a second magnet system comprising a second plurality of concentrically arranged circular-loop coils, arranged with mirror symmetry with respect to the first magnet system relative to a symmetry plane located between the first magnet system and the second magnet system, creating an annular plasma confinement area at the symmetry plane with a magnetic field normal to the symmetry plane at the symmetry plane.

As an annular plasma confinement area should be understood a rotationally symmetric region in which the charged particles of the plasma are confined, including cases having, for example, a donut-like or disc-like topology.

Hereby, the resulting magnetic field configuration may confine charged particles using static axial and radial fields in an open-field-line magnetic mirror configuration.

The arrangement with the first coil being arranged to carry a current in a first direction and the second coil being arranged to carry a current in an opposite, second, direction, in each of the first magnet system and the second magnet system, allows for the creation of a region of high magnetic flux density between the first coil and the second coil, while maintaining a relatively lower flux density near the symmetry plane. Compared to a conventional magnetic mirror arrangement, this allows for an increased mirror ratio, thereby reducing the size of the loss cone and allowing for better confinement of the plasma.

Moreover, compared to a tokamak, when confining a plasma, the charge separation effects may be avoided, where no induced plasma current may be needed for stability of the plasma. With the resulting quasi-static plasma, i.e., without a global plasma current, one may in turn avoid magnetohydrodynamic instabilities. Further, a fusion reactor may be allowed to run in a continuous (steady) state without current ramping.

Further, the resulting magnetic field configuration may allow for an uncomplicated way of heating the plasma.

The first plurality of concentrically arranged coils may, for example, be identically designed to the second plurality of concentrically arranged coils. This is a particularly simple way of achieving the desired magnetic field configuration.

The device may further comprise a third magnet system arranged radially outside the plasma confinement area, the third magnet system comprising at least one circular-loop coil.

Hereby, it is possible to arrange for a strictly radially increasing magnetic field, which may be beneficial for the stability of the confined plasma, further improving on a conventional magnetic mirror.

Further, the arrangement with a third magnet system may allow for arranging a concave magnetic field in the whole plasma confinement area, which may be beneficial for the stability of the confined plasma.

Thus, a rotationally symmetric open-field-line plasma confinement device may be provided that has a high mirror ratio and has properties beneficial for plasma stability.

Moreover, the third magnet system may allow controlling a confined plasma by current adjustment in the circular-loop coil of the third magnet system.

The third magnet system may comprise a first coil arranged on a same side of the symmetry plane at the first magnet system and a second coil arranged on an opposite side of the symmetry plane, wherein the second coil is arranged with mirror symmetry relative to the first coil.

The first plurality of concentrically arranged coils in the first magnet system and the second plurality of concentrically arranged coils in the second magnet system may each be embedded in respective ferromagnetic structures. This increases the magnetic flux through the relatively higher permeability of the ferromagnetic material, leading to a stronger magnetic field, and thereby better confinement, for a given coil current.

Optionally, a said ferromagnetic structure does not cover at least one coil of a respective said plurality of coils in a direction towards said symmetry plane. This shields magnetic flux in the direction away from the symmetry plane and directs the magnetic flux in the direction towards the symmetry plane, i.e., towards the plasma. Thereby, more efficient shielding is achieved for a given coil current.

A said ferromagnetic structure may be ferromagnetic steel.

The device according to the first aspect may be used for confining a plasma.

The device according to the first aspect may be used in a fusion reactor.

According to a second aspect, there is provided a method of plasma confinement, comprising, in a first magnet system, comprising a first plurality of concentrically arranged circular-loop coils, a first coil carrying a current in a first direction and a second coil carrying a current in a second direction opposite to the first direction; and a second magnet system comprising a second plurality of concentrically arranged circular-loop coils carrying currents with mirror symmetry with respect to the first magnet system relative to a symmetry plane located between the first magnet system and the second magnet system, creating an annular plasma confinement area at the symmetry plane with a magnetic field normal to the symmetry plane.

Embodiments and advantages of this second aspect may generally be similar to or the same as those of the first embodiment.

The method may further comprise controlling a confined plasma by current adjustment in a third magnet system arranged radially outside the plasma confinement area.

The controlling may comprise changing the radius of the plasma confinement area, which thereby, in turn, may change the radius of the plasma.

The method may further comprise heating the plasma by inserting an ion beam in an area radially outside the plasma confinement area or radially inside the plasma confinement area and allowing ions from the ion beam to drift into the plasma confinement area.

In contrast to existing solutions—such as Tokamaks or similar devices, where the magnetic field created to confine the plasma also deflects ions coming from outside from the plasma, and heating needs to be performed using neutral beams that will penetrate though the magnetic field and then only get ionized once inside the plasma—here, high-energy ions may conveniently and simply be added to the confined plasma, or provided for initial heating of the plasma to create a fusion condition, since the present magnetic field configuration may pull the ions into the plasma confinement area, rather than deflect them. This may lead to a less complicated procedure and may further reduce particle losses.

According to a third aspect, there is provided a magnetic mirror machine and/or a particle confinement device, comprising a first magnet system, comprising a first plurality of concentrically arranged circular-loop coils, comprising a first coil arranged to carry a current in a first direction, and a second coil arranged to carry a current in a second direction opposite to the first direction; and a second magnet system comprising a second plurality of concentrically arranged circular-loop coils, arranged with mirror symmetry with respect to the first magnet system relative to a symmetry plane located between the first magnet system and the second magnet system, creating an annular particle confinement area at the symmetry plane with a magnetic field normal to the symmetry plane at the symmetry plane.

Embodiments and advantages discussed in conjunction with the other aspects, and throughout this disclosure, are compatible with this third aspect.

According to a fourth aspect, there is provided a method of confining charged particles, comprising, in a first magnet system, comprising a first plurality of concentrically arranged circular-loop coils, a first coil carrying a current in a first direction and a second coil carrying a current in a second direction opposite to the first direction; and a second magnet system comprising a second plurality of concentrically arranged circular-loop coils carrying currents with mirror symmetry with respect to the first magnet system relative to a symmetry plane located between the first magnet system and the second magnet system, creating an annular particle confinement area at the symmetry plane with a magnetic field normal to the symmetry plane.

Embodiments and advantages discussed in conjunction with the other aspects, and throughout this disclosure, are compatible with this third aspect.

As is generally known, plasma confinement devices may be based either on open magnetic field lines or closed field lines.

Closed-field line devices may, for example, have a toroidal magnetic field. An example of such a device is a tokamak.

Closed-field-line devices may potentially confine plasma particles without leakage, as the particles will follow the field lines, but other issues, such as E×B drift due to charge separation and magneto-hydrodynamic (MHD) effects may cause a plasma to escape. Special arrangements need to be made for removing helium ash, such as pulsing the system, disallowing steady-state operation.

One major problem with the toroidal field is that ions will escape confinement due to E×B drift caused by charge separation.

In a tokamak, this problem may be addressed by inducing a current in the plasma, where the current will create a poloidal field. This results in the magnetic field twisting along the torus, with poloidal and toroidal fields together making up the twisted magnetic field. This mitigates the E×B drift but introduces an additional problem in that the plasma only will be confined while the current in the inner magnetic coil is ramping up, i.e. it is not possible to run in steady state.

Further, the plasma current will result in several instabilities related to magnetohydrodynamic effects, such as Kink instabilities. This may be addressed by various compensation coils around the reactor vessel, but the basic characteristics of the plasma will still be unstable due to the large magnetohydrodynamic effects.

Open-field-line plasma confinement devices, as known in the prior art, may operate by a principle of magnetic mirroring, wherein the charged particles of the plasma are reflected in areas of increasing magnetic flux density at the respective ends of the confinement area. Such machines have the ability of steady-state operation, and may generally have less problems with charge separation, and also allow for easier handling of helium ashes.

While recognized to be able to provide plasma confinement, open field-line plasma confinement devices will always have leakage of charge particles with velocity vectors sufficiently aligned with the magnetic field lines. More specifically, the mirror effect will occur for all particles within a range of angles of approach outside a loss cone defined by the helix spiral pitch angle of the charged particle's gyration spin around the magnetic field lines.

The extent of the loss cone is determined by the mirror ratio $r_{mirror}$, defined as the ratio between maximum $B_{max}$ and minimum $B_{min}$ magnetic flux density following a magnetic field line:

$$r_{mirror} = \frac{B_{max}}{B_{min}}.$$

The angle defining the loss cone is then:

$$\alpha_{cone} = \arc\cos\frac{1}{\sqrt{r_{mirror}}}.$$

Thus, it can be seen that high mirror ratio will lead to a small loss cone, so that only the particle having velocities the most aligned with the field lines will escape. Conversely, a low mirror ratio will lead to a larger loss cone.

A first property, known from literature, of the magnetic field lines of a plasma confinement device, associated with magneto-hydrodynamic stability of the confined plasma, is a concave magnetic field, i.e., a magnetic field having concave magnetic field lines, as seen from outside the plasma confinement area and the confined plasma.

A second property, known from literature, of the magnetic field lines of a plasma confinement device, associated with magneto-hydrodynamic stability of the confined plasma, is a radially strictly increasing magnetic field.

Figure 1A:
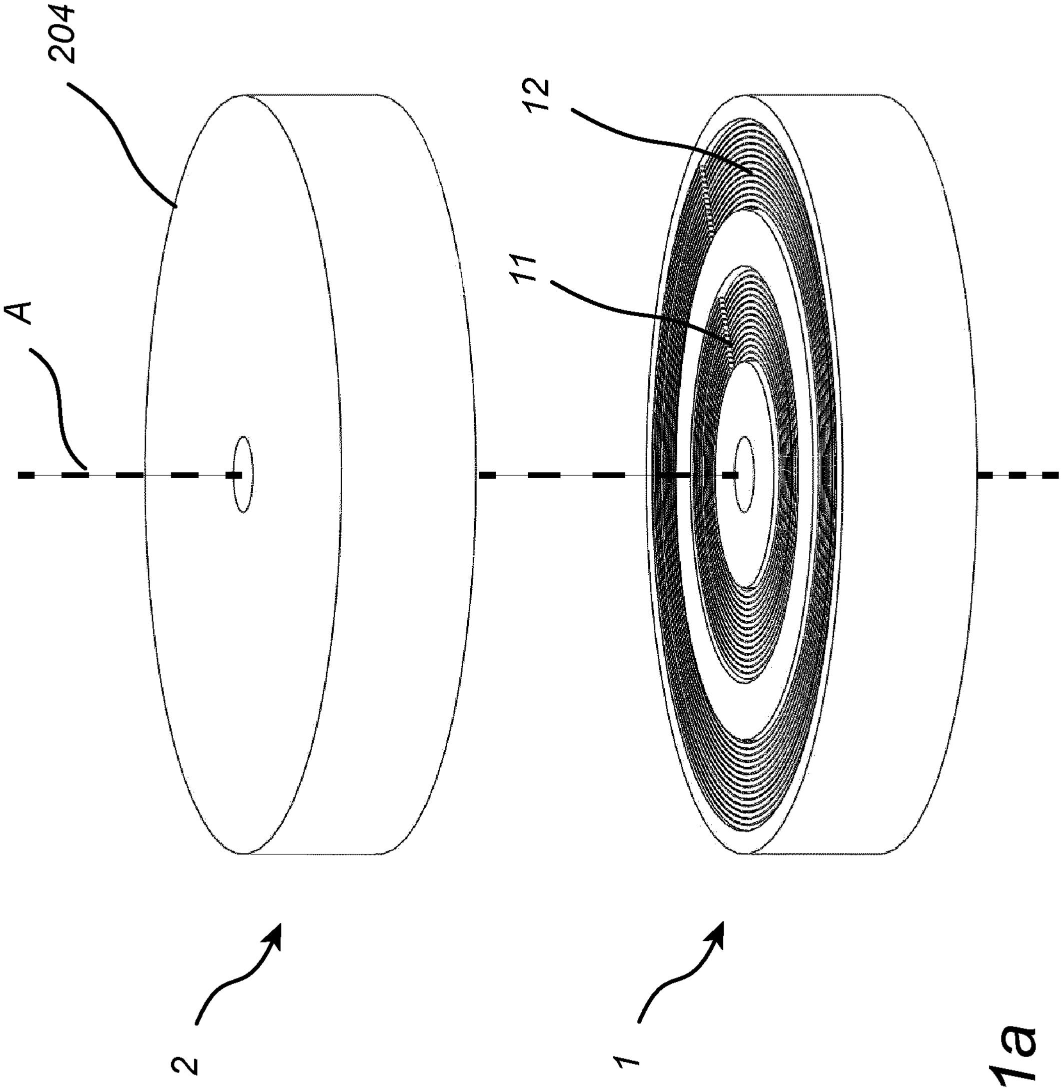
FIG. 1*a* is a perspective view of a first magnet system and a second magnet system that may be comprised in a plasma confinement device.
Figure 1B:
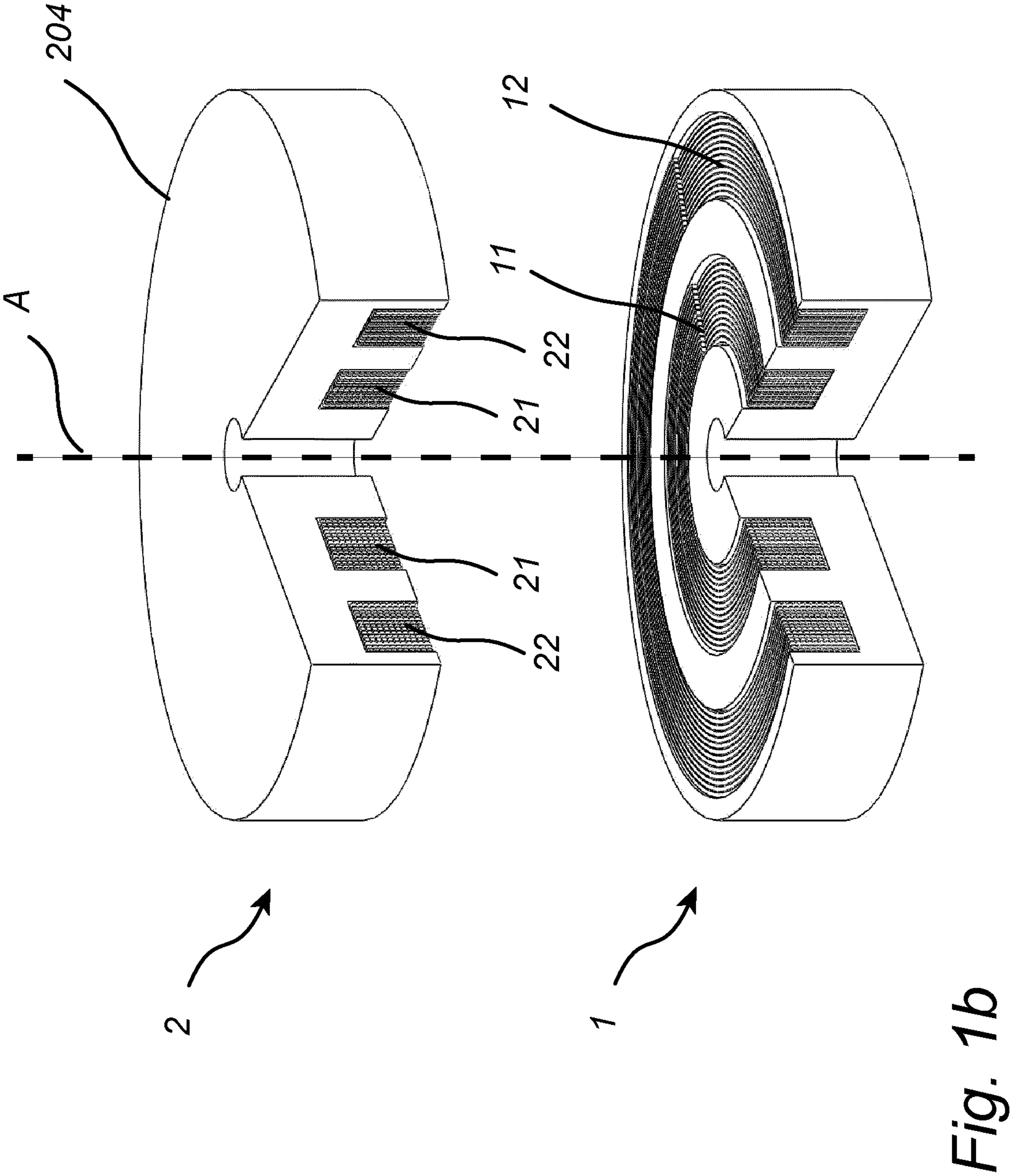
FIG. 1*b* is a cut-out perspective view of the first and second magnet systems of FIG. 1*a*.
Figure 1C:
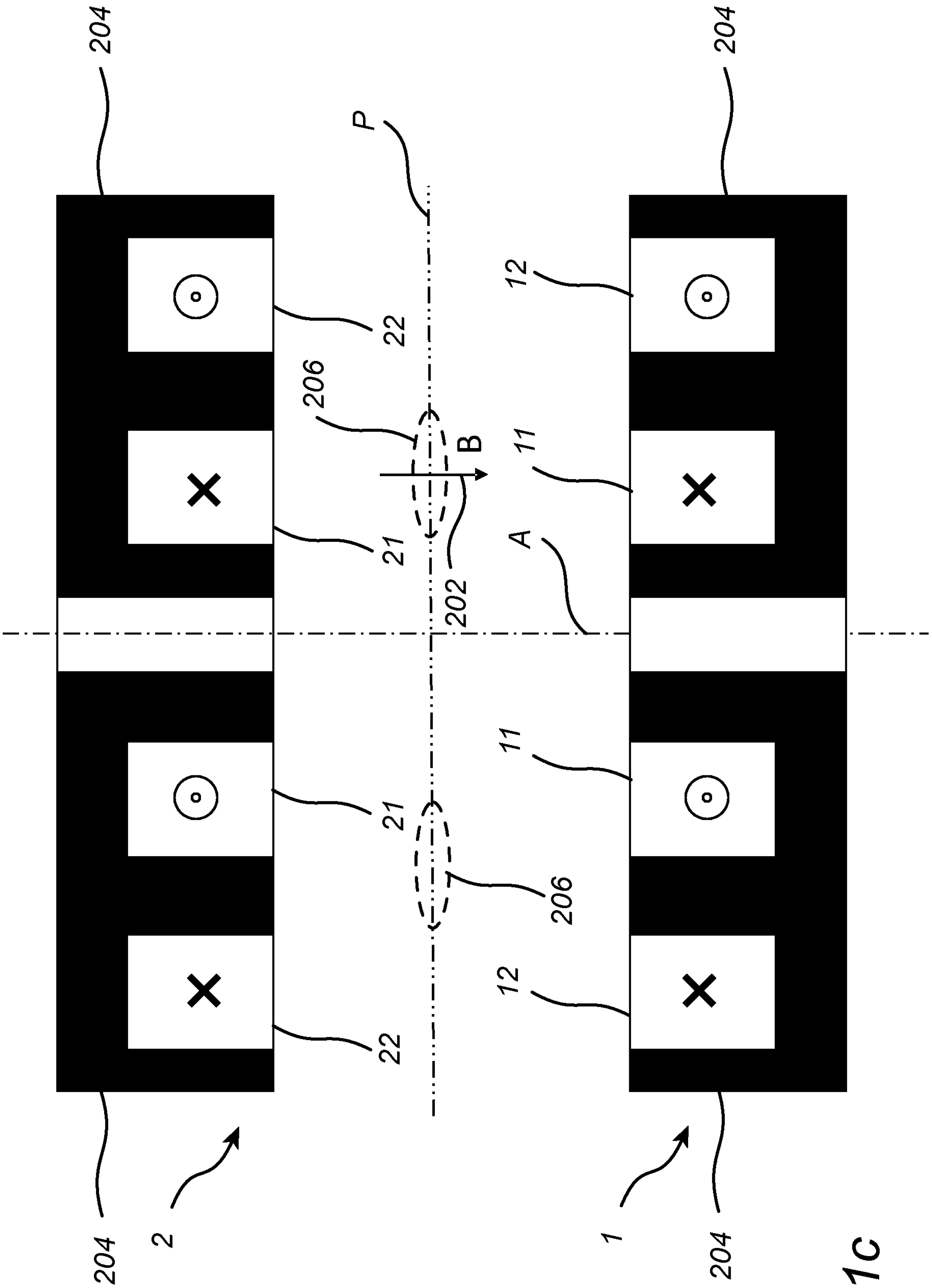
FIG. 1*c* is a planar cross-sectional view of the first and second magnet systems of FIGS. 1*a* and 1*b*.
Figure 5A:
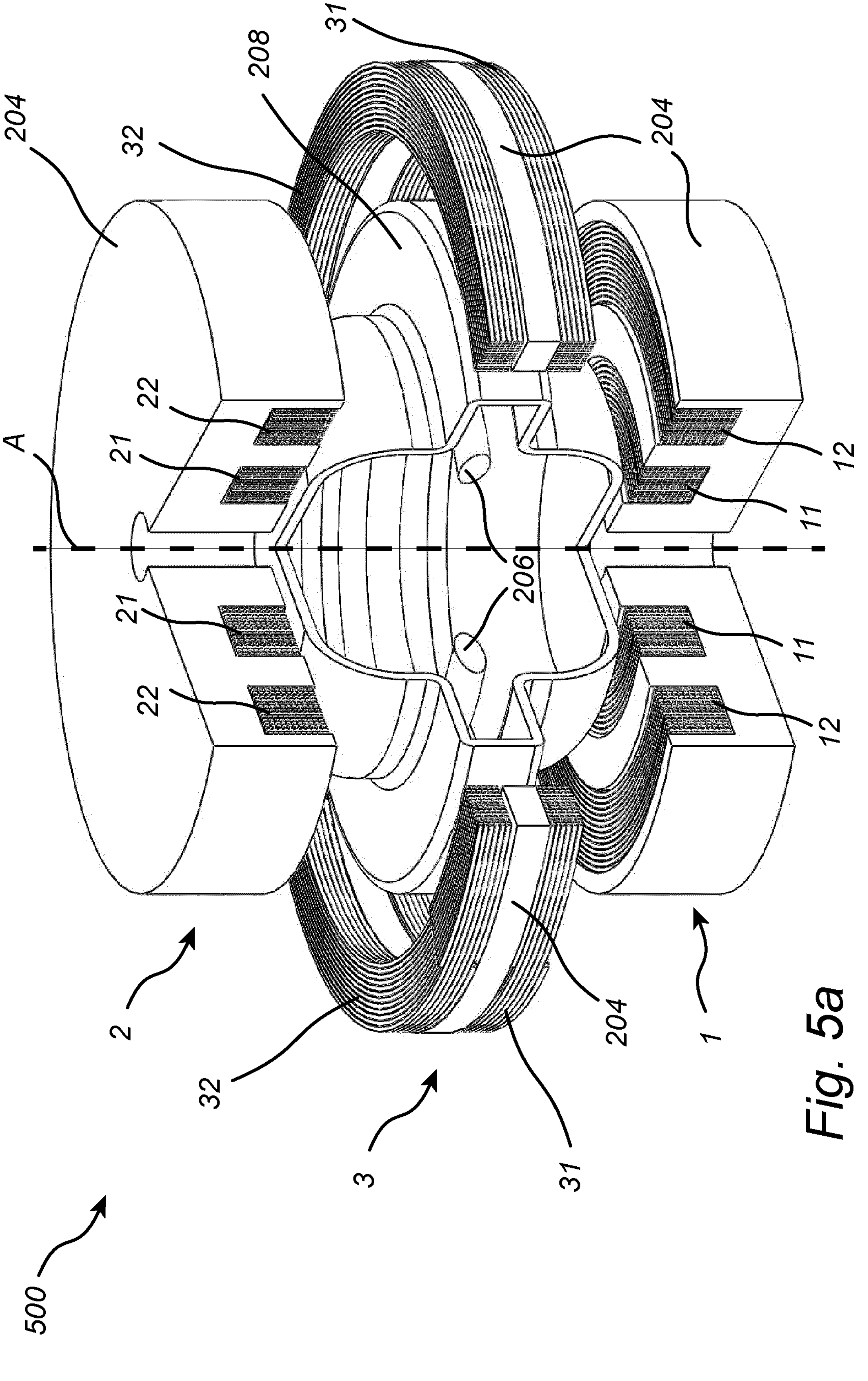
FIGS. 5*a* and 5*b* are cut-out perspective drawings showing plasma confinement devices.
Figure 5B:
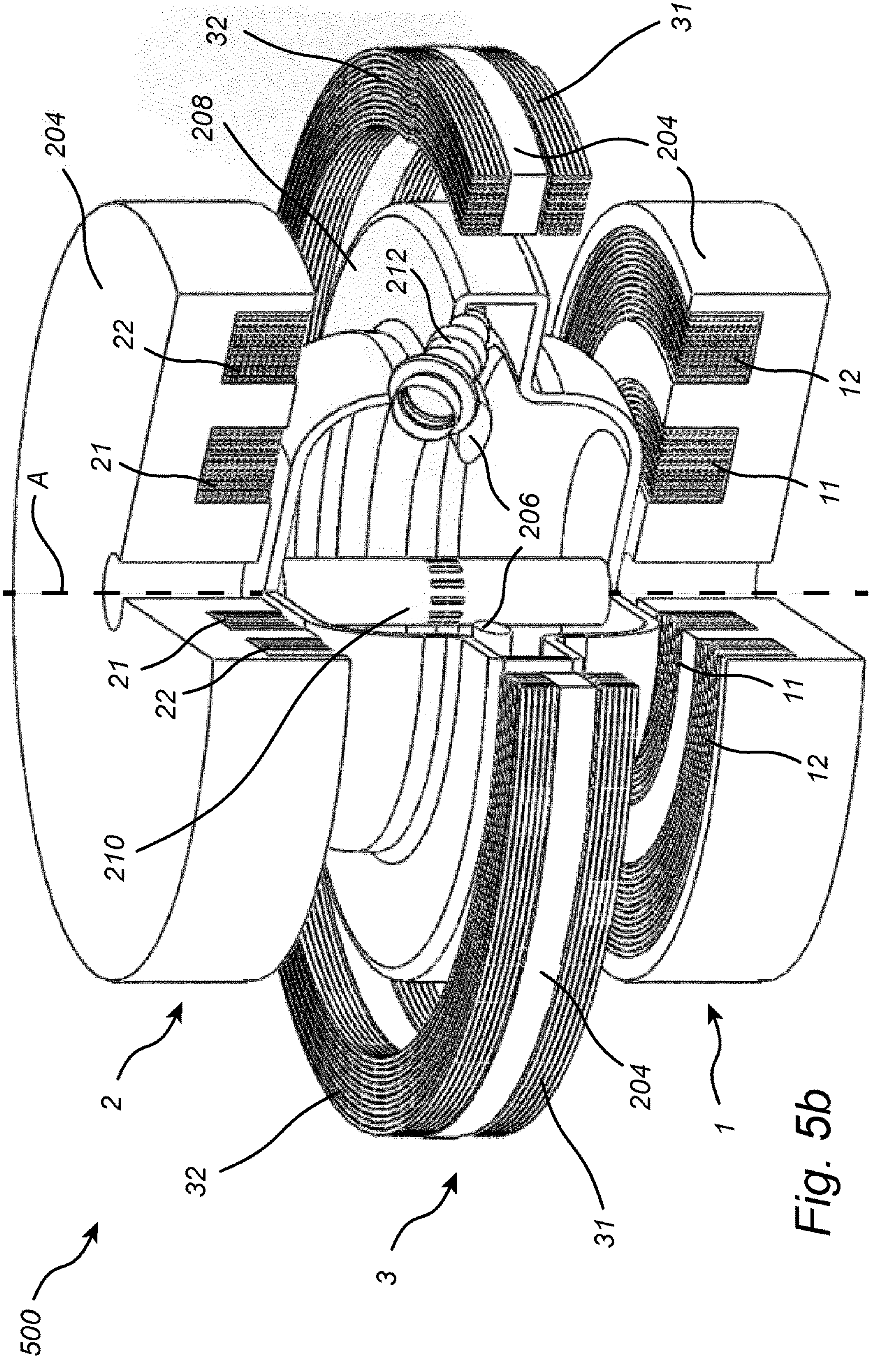

FIGS. 1*a*, 1*b*, and 1*c* show a first magnet system 1 and a second magnet system 2 that may be comprised in a plasma confinement device (cf. FIGS. 5*a* and 5*b*).

The first magnet system 1 comprises a first plurality of concentrically arranged circular-loop coils arranged around a symmetry axis A, for example, as shown a first, inner coil 11 and a second, outer, coil 12, arranged concentrically to radially outside the inner coil 11.

Further, the first magnet system 1 comprises a second magnet system 2 comprising a second plurality of circular-loop coils, likewise concentrically arranged around the axis A, but vertically displaced relative to the first magnet system. The second magnet system may, for example, as shown, comprise a first, inner coil 21 and a second, outer, coil 22, arranged concentrically to and radially outside the inner coil 21.

FIG. 1*c* shows a cross sectional view through the first magnet system 1 and the second magnet system 2 in a cross-sectional plane through the symmetry axis A.

The coils 21, 22 of the second magnet system 2 are arranged with mirror symmetry with respect to the coils 11, 12 of first magnet system 1 relative to a symmetry plane P, which is at equal distance to each of the first magnet system 1 and to the second magnet system 2.

Throughout this disclosure, reference may be made to coordinate systems and directions relative to the axis A and the symmetry plane P. In particular, coordinates and directions may be described with reference to a cylindrical coordinate system or to a cartesian coordinate system, each having as origin the intersection of the symmetry axis A and the symmetry plane P.

The cartesian coordinate system, with coordinates referred to as "x, y, z", "X, Y, Z", "A, B, C" or the like, should be understood as having the first two coordinate axes "x, y", "X, Y", "A, B", or the like, lying in the symmetry plane P and the third coordinate axis "z", "Z", "C", or the like, extending in a positive direction upwards (as seen in FIGS. 1-5) from the origin along the symmetry axis A.

If no units for spatial coordinates are disclosed, units of meters or degrees are implied. If no unit of time is disclosed, a unit of seconds is implied.

The cylindrical coordinate system, should be understood as having a radial direction and coordinate ("R", "r", or the like) extending from the origin at the intersection of the symmetry axis A and the symmetry plane P, an azimuth direction and coordinate ("phi", "Phi", or the like) measured as a rotational angle around the symmetry axis A, and an axial direction and coordinate ("z", "Z", "C" or the like) extending in a positive direction from the origin upwards along the symmetry axis A. Positive direction for the azimuth direction is according to the right-hand rule with respect to the positive axial direction.

Further, throughout this disclosure references will be made to figures showing simulated magnetic field (magnetic flux density) lines, i.e., equal magnetic potential lines, including FIGS. 2, 4*a*, 4*b*, 9, 10, 11, and 12. Due to the symmetry properties of the magnet systems disclosed herein, the magnetic field properties of such a quadrant are sufficient for describing the field configuration as a whole, i.e., due to the mirror symmetry with respect to the symmetry plane P and the rotational symmetry around the axis A. Therefore, a figure showing a quadrant should be interpreted as disclosing the field and magnet system configuration in all four quadrants, subject to the mention symmetry properties. Moreover, due to the rotational symmetry, the figures should be interpreted as disclosing three-dimensional magnetic fields and magnet systems.

Still with reference to FIG. 1*c*, the first plurality of concentrically arranged coils 11, 12 of the first magnet system 1 may, as shown, be identically designed to the second plurality of concentrically arranged coils 21, 22 of the second magnet system 2, respecting the mirror symmetry.

FIG. 1*c* further shows coil current directions during operation of the first magnet system and the second magnet system as used in a plasma confinement device (cf. FIGS. 5*a* and 5*b*).

In the first magnet system 1, the current of the inner coil 11 is configured to run in a direction into the cross-sectional plane (marked with a cross) on the right side of FIG. 1*c* and out of the cross-sectional plane (marked with a dotted circle) in the left side of FIG. 1*c*, i.e., counter-clockwise a seen from above the first magnet system. Conversely, the current of the outer coil 12 is configured to run in a direction out of the cross-sectional plane (marked with a dotted circle) on the right side of FIG. 1*c* and into the cross-sectional plane (marked with a cross circle) in the left side of FIG. 1*c*, i.e., clockwise a seen from above the first magnet system.

Thus, the first plurality of concentrically arranged circular-loop coils comprises a first coil 11 arranged to carry a current in a first direction, and a second coil 12 arranged to carry a current in a second direction opposite to the first direction.

Similarly, respecting the mirror symmetry with respect to the symmetry plane P, in the second magnet system 2, the current of the inner coil 21 is configured to run in a direction into the cross-sectional plane (marked with a cross) on the right side of FIG. 1*c* and out of the cross-sectional plane (marked with a dotted circle) in the left side of FIG. 1*c*, i.e., counter-clockwise a seen from above the first magnet system and the current of the outer coil 22 is configured to run in a direction out of the cross-sectional plane (marked with a dotted circle) on the right side of FIG. 1*c* and into the cross-sectional plane (marked with a cross circle) in the left side of FIG. 1*c*, i.e., clockwise a seen from above the first magnet system.

Thus, the currents of the second magnet system 2, with first magnet system 1 and the second magnet system 2 in operation, are arranged with mirror symmetry with respect to the first magnet system relative to the symmetry plane P located between the first magnet system 1 and the second magnet system 2.

As shown with a vector arrow 202 indicating the magnetic field (magnetic flux density) vector B, at the symmetry plane P, the mirror-symmetric configuration of currents in the first magnet system 1 and the second magnet system 2 creates, at the symmetry plane P, a magnetic field normal to the symmetry plane P. An annular, typically toroid-shaped, plasma confinement area 206 (cf. FIGS. 2, 5*a* and 5*b*), indicated with an approximate dashed ellipse, is formed at the symmetry plane P, as will be explained further in the following.

Thus, expressed in other words, a plasma confinement device may comprise two disc-shaped magnet systems 1, 2 facing each other in axial direction, with a space in-between where a plasma may be confined. Each magnet system 1, 2 has at least two coils 11, 12, 21, 22 where the current direction and magnitude create a normal magnetic field boundary condition at the symmetry plane P.

Further, still with reference to FIGS. 1*a*, 1*b*, and 1*c*, the first plurality of concentrically arranged coils 11, 12 in the first magnet system 1 and the second plurality of concentrically arranged coils 21, 22 in the second magnet system 2 each may be embedded in respective core structures 204, which may be of ferromagnetic material, such as ferromagnetic steel. Alternatively, the core structure 204 may be of non-ferromagnetic material, such as non-ferromagnetic steel.

Optionally, as shown, the respective core structures 204 of the first magnet system 1 and the second magnet system 2 do not cover at least one coil, as shown all coils of the respective plurality of coils in a direction towards the symmetry plane P, but covers the respective coils 11, 12, 21, 22 in all other directions.

Figure 9:
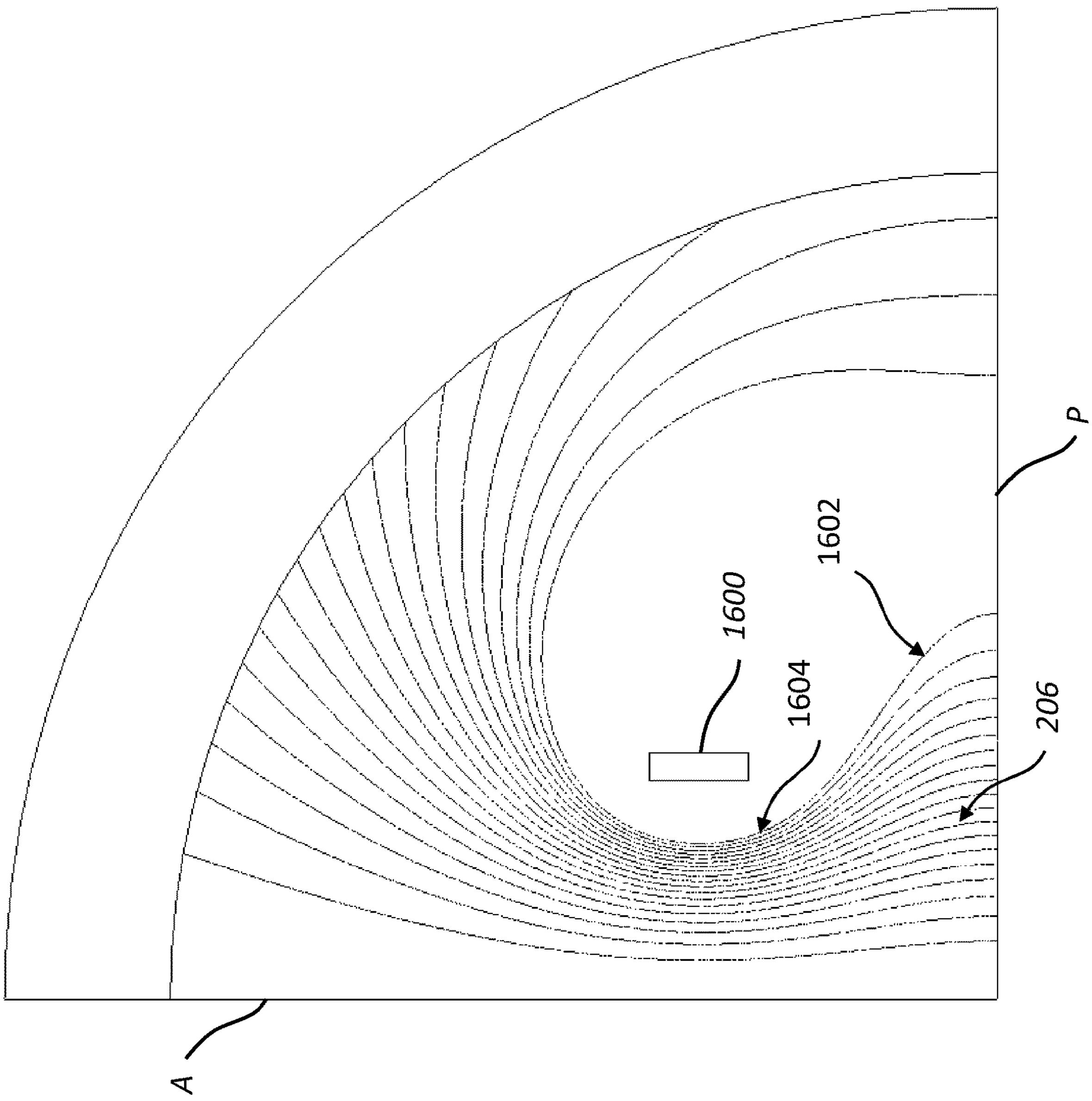
FIG. 9 is a planar view showing simulated magnetic field lines generated by a conventional straight magnetic mirror configuration.

For comparison purposes, FIG. 9 shows simulated magnetic field lines, of a straight magnetic mirror configuration comprising two coils, viz., a single coil 1600 in each hemisphere. As typical for such a straight magnetic mirror ("bottle") configuration, the magnetic field displays a region 1602 of relatively low magnetic flux density near the symmetry plane P and a region 1604 of relatively high magnetic flux density near the coil 1600, creating a confinement area 206 for charged particles, based on the principle of magnetic reflection, as explained above. Moreover, as seen from radially outside the confinement area 206, i.e. from the right in FIG. 9, a relatively large region near the symmetry plane displays convex magnetic field lines, while a smaller region closer to the coil 1600 displays concave magnetic field lines, the former, as per the first property discussed above, being disadvantageous and the latter being advantageous. Further, it can be noted that, at the symmetry plane P, the magnetic flux density is decreasing with increasing radius.

The disclosed magnet system configurations makes the magnetic field normal to the symmetry plane P throughout the symmetry plane P, as is evident by the magnetic field lines crossing the symmetry plane P at right angles. FIG. 2, just as FIG. 1*c*, shows the magnetic field lines in a cross-sectional plane through the axis A. Due to the rotational symmetry of the first magnet system 1 and the second magnet system 2, the magnetic field configuration is also rotationally symmetric, so that to that FIG. 2 is representative for any such cross-sectional plane and therefore for the whole field configuration. In particular, the magnetic field has no toroidal component, i.e., in a direction pointing into or out of the cross-sectional plane of FIG. 2, which is the azimuth direction referred to above. In other words, the magnetic field vectors lie in the cross-sectional plane for any such cross-sectional plane through the axis A. The same applies for the configurations of FIGS. 9-13.

In FIG. 2, magnetic field lines resulting from the mirror-symmetric configuration of currents in the first magnet system 1 and the second magnet system 2 discussed above in conjunction with FIGS. 1*a*, 1*b*, and 1*c*, are shown. The resulting magnetic field configuration results in the annular confinement area 206, again represented by approximate dashed ellipses, in which ions of a plasma may be confined. The plasma confinement area is radially restricted between an inner radius and an outer radius, as confirmed by simulations. Plasma ions confined in the plasma confinement device, in the plasma confinement area 206 at the symmetry plane P, will perform a circular gyration motion in that plane due to the magnetic field perpendicular to that plane. As mentioned, no toroidal field is present. Given the absence of a toroidal magnetic field component, therefore, there will be no axial Lorentz force on the ions at the symmetry plane P. Moving away from the symmetry plane in axial direction, along a field line, the Lorentz force may push the ion back towards the symmetry plane, confining the ion at the symmetry plane.

Unlike the situation in a tokamak, where the plasma is confined with toroidal and poloidal fields, a confinement device according to the present disclosure confines plasma with axial (parallel to the axis A) and radial fields.

Figure 10:
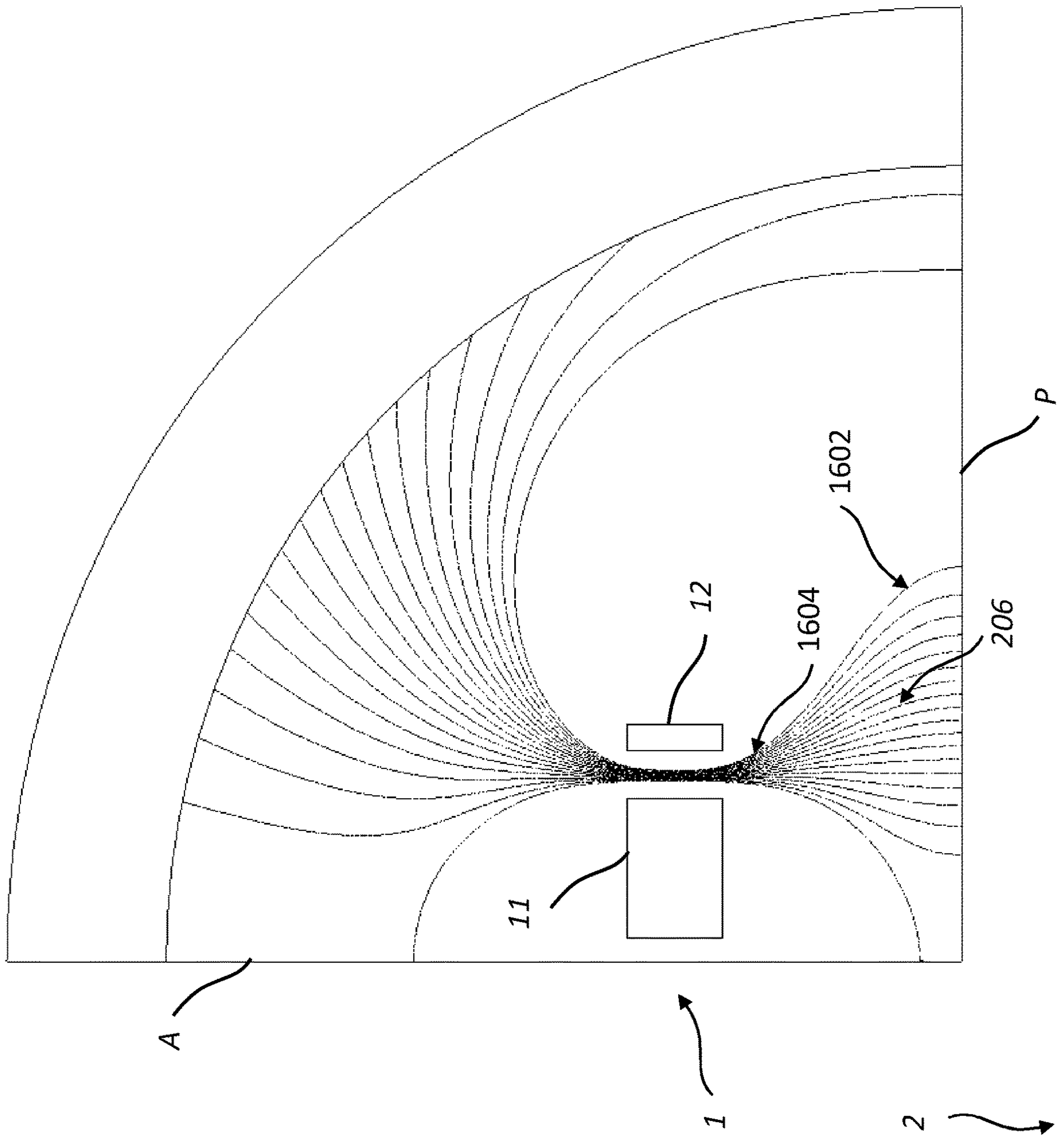
FIG. 10 is a planar view showing simulated magnetic field lines generated by first and second magnet systems.

FIG. 10 shows another configuration that may be comprised in a plasma confinement device, again, arranged with a first magnet system 1 comprising a first coil 11 arranged to carry a current in a first direction; and a second coil 12 arranged to carry a current in a second direction opposite to the first direction (cf. FIG. 1*c*); and a second magnet system (not shown) comprising a first and a second concentrically arranged circular-loop coil (not shown), arranged with mirror symmetry with respect to said first magnet system relative to the symmetry plane P located between the first magnet system 1 and the second magnet system 2. Just as for the straight magnetic mirror of FIG. 9, a confinement area for charged particles, i.e., a plasma confinement area 206, is the symmetry plane P with a magnetic field normal to the symmetry plane at the symmetry plane.

Just as discussed above in conjunction with FIG. 9, as shown in FIG. 10, and also evident in FIG. 2, through an appropriate choice of the geometries of the of the coils 11. 12 of the first magnet system, and the second magnet system 2, and the currents carried therein, it is possible to achieve a field configuration displaying a region 1602 of relatively low magnetic flux density near the symmetry plane P and a region 1604 of relatively high magnetic flux density near the coils 11, 12, creating a confinement area 206 for charged particles, based on the principle of magnetic reflection. Moreover, just as in FIG. 10, as seen from radially outside the confinement area 206, i.e. from the right in FIG. 9, the region 1602 near the symmetry plane displays convex magnetic field lines, while the region 1604 displays concave magnetic field lines.

Moreover, as is evident from comparing FIG. 10 (and FIG. 2) with FIG. 9, an appropriate choice of the geometry of the coils and the currents running therein, allows for a considerably increased magnetic flux density in the region 1604 of relatively high magnetic flux density near the coils 11, 12. This may provide a higher mirror ratio, improving confinement of the charged particles in a plasma, due to the reduced loss cone.

Figure 3A:
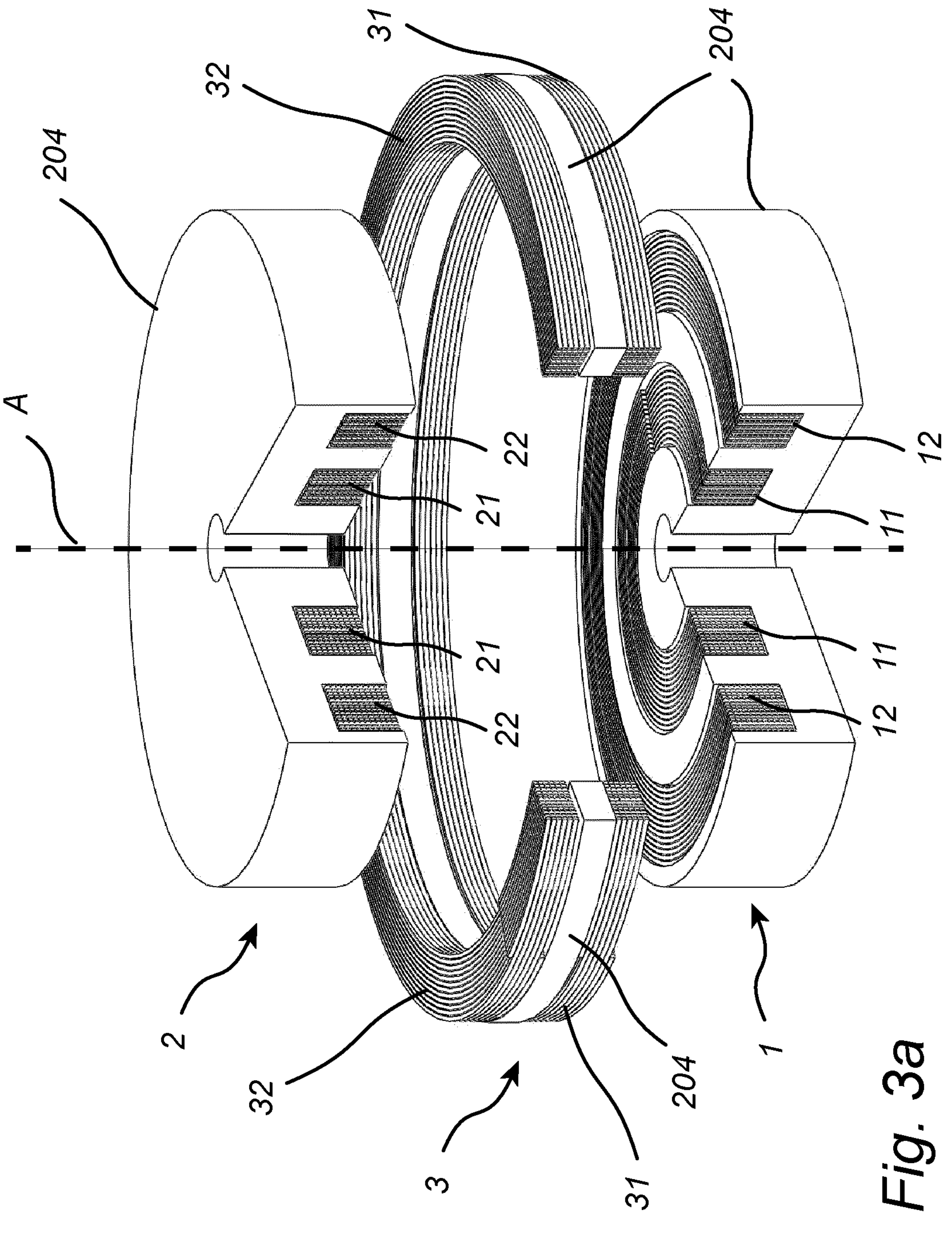
FIG. 3*a* is a cut-out perspective view of a first magnet system, a second magnet system, and a third magnet system comprised that may be comprised in a plasma confinement device.
Figure 3B:
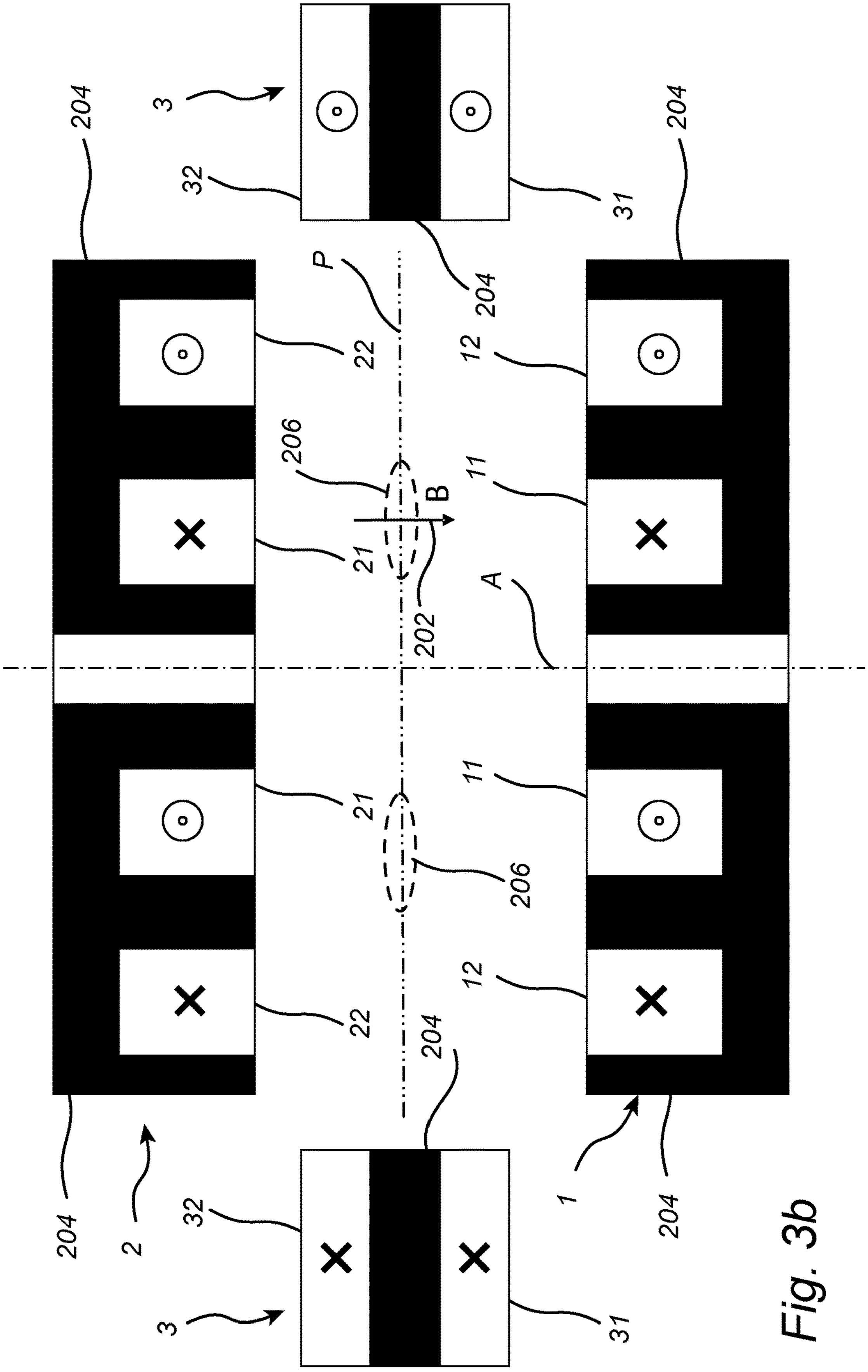
FIG. 3*b* is a planar cross-sectional view of the first, second and third magnet systems of FIG. 3*a*.

FIGS. 3*a* and 3*b* show a first magnet system 1, a second magnet system 2, and a third magnet system that may be comprised in a plasma confinement device (cf. FIGS. 5*a* and 5*b*). Unless specifically mentioned below, the magnet systems of FIGS. 3*a*, 3*b*, and FIG. 4 have the same features and characteristics as the first magnet system and the second magnet system described above in conjunction with FIGS.

1*a*, 1*b*, 1*c*, and 2. The third magnet system 3 is arranged radially outside, with respect to the axis A, the plasma confinement area 206.

Further, the third magnet system 3 may, as shown, be located radially outside, with respect to the axis A, the first magnet system 1 and the second magnet system 2.

The third magnet system 3 comprises at least one circular-loop coil, for example, as shown, a first circular-coil loop coil 31 arranged on the same side of the symmetry plane P as the first magnet system and a second circular-coil loop 32 arranged on the opposite side of the symmetry plane P, wherein the second coil 32 is arranged with mirror symmetry relative to the first coil 31. In particular, with reference to FIG. 3*b*, each of the first coil 31 and the second coil 32 has a current configured to run, with the magnet system in operation, in a direction into the cross-sectional plane (marked with a cross) on the left side of FIG. 3*b* and out of the cross-sectional plane (marked with a dotted circle) on the right side of FIG. 3*c*, i.e., clockwise as seen from above the first magnet system.

Figure 4A:
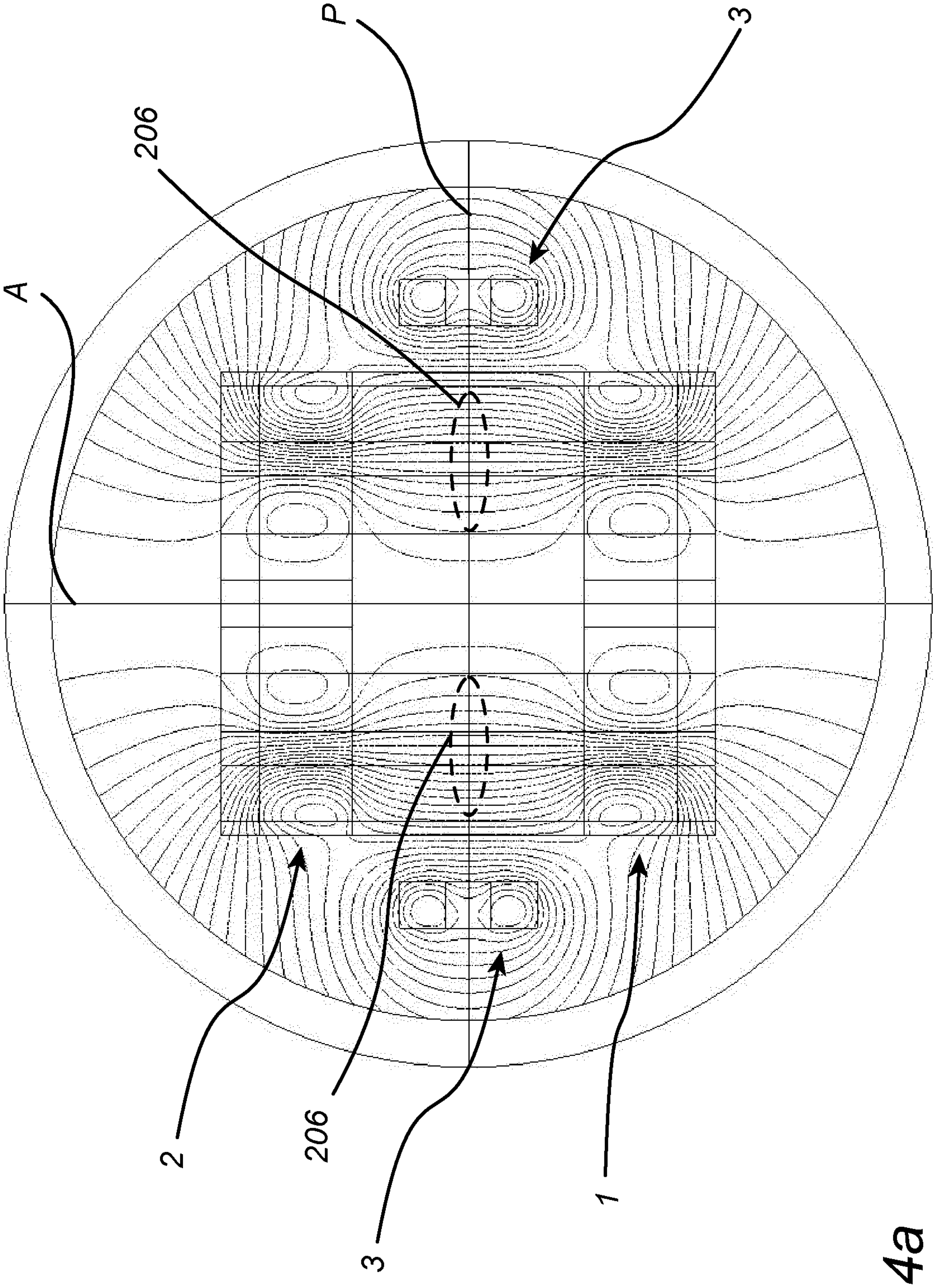
FIGS. 4*a* and 4*b* are planar views showing simulated magnetic field lines generated by the first, second, and third magnet systems of FIGS. 3*a* and 3*b*.
Figure 4B:
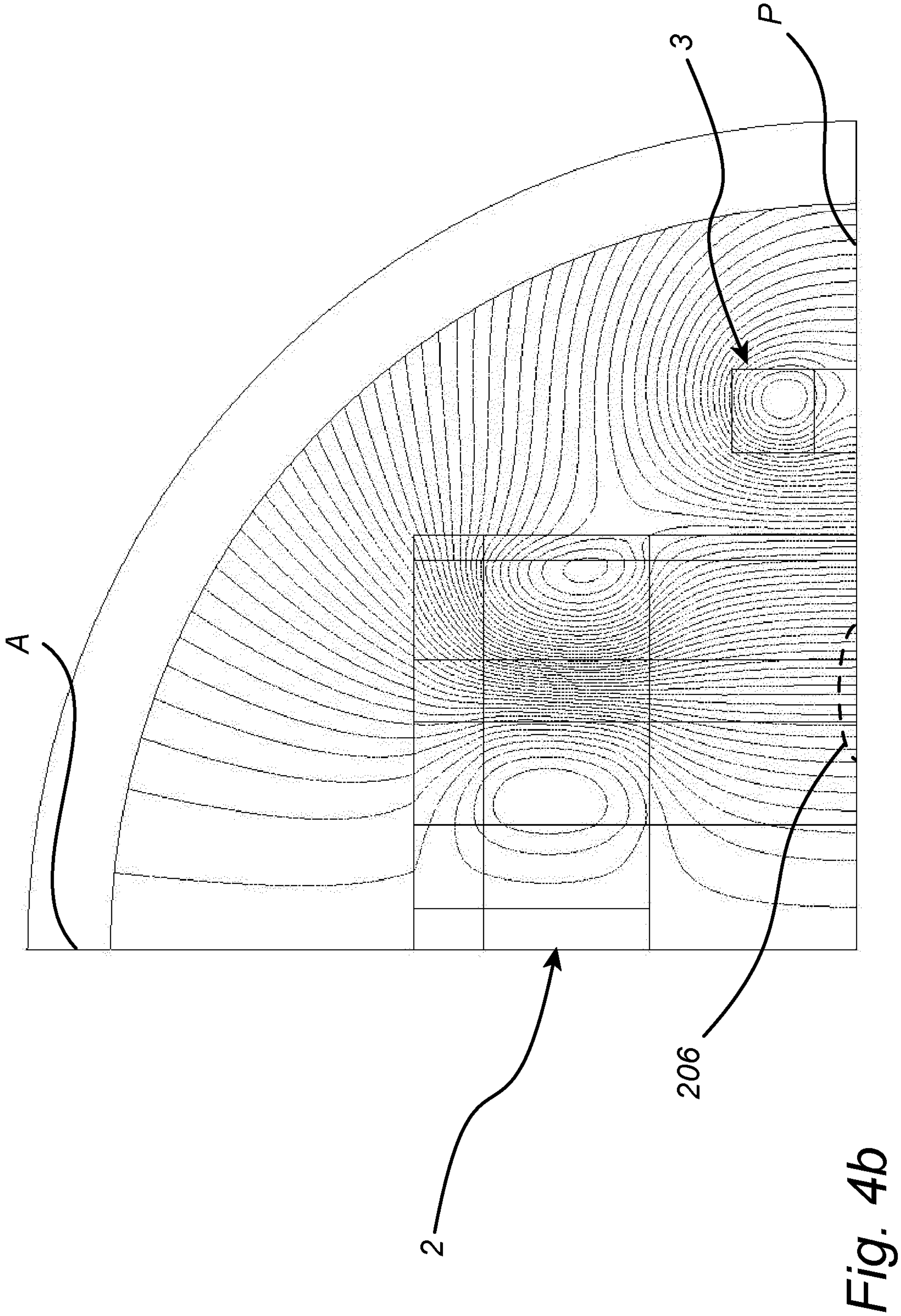

Resulting simulated magnetic field lines are shown in FIGS. 4*a* and 4*b*. The magnetic field configuration is similar to that of FIG. 2. In particular, an annular plasma confinement area 206 is formed, just as described above in conjunction with FIGS. 1*a*, 1*b*, 1*c*, and 2. FIG. 4*b* shows a quadrant of FIG. 4*a* close up. Due to the symmetry properties of the magnet systems, the magnetic field properties of such a quadrant are sufficient for describing the field configuration as a whole, i.e., due to the mirror symmetry with respect to the symmetry plane P and the rotational symmetry around the axis A.

Figure 11:
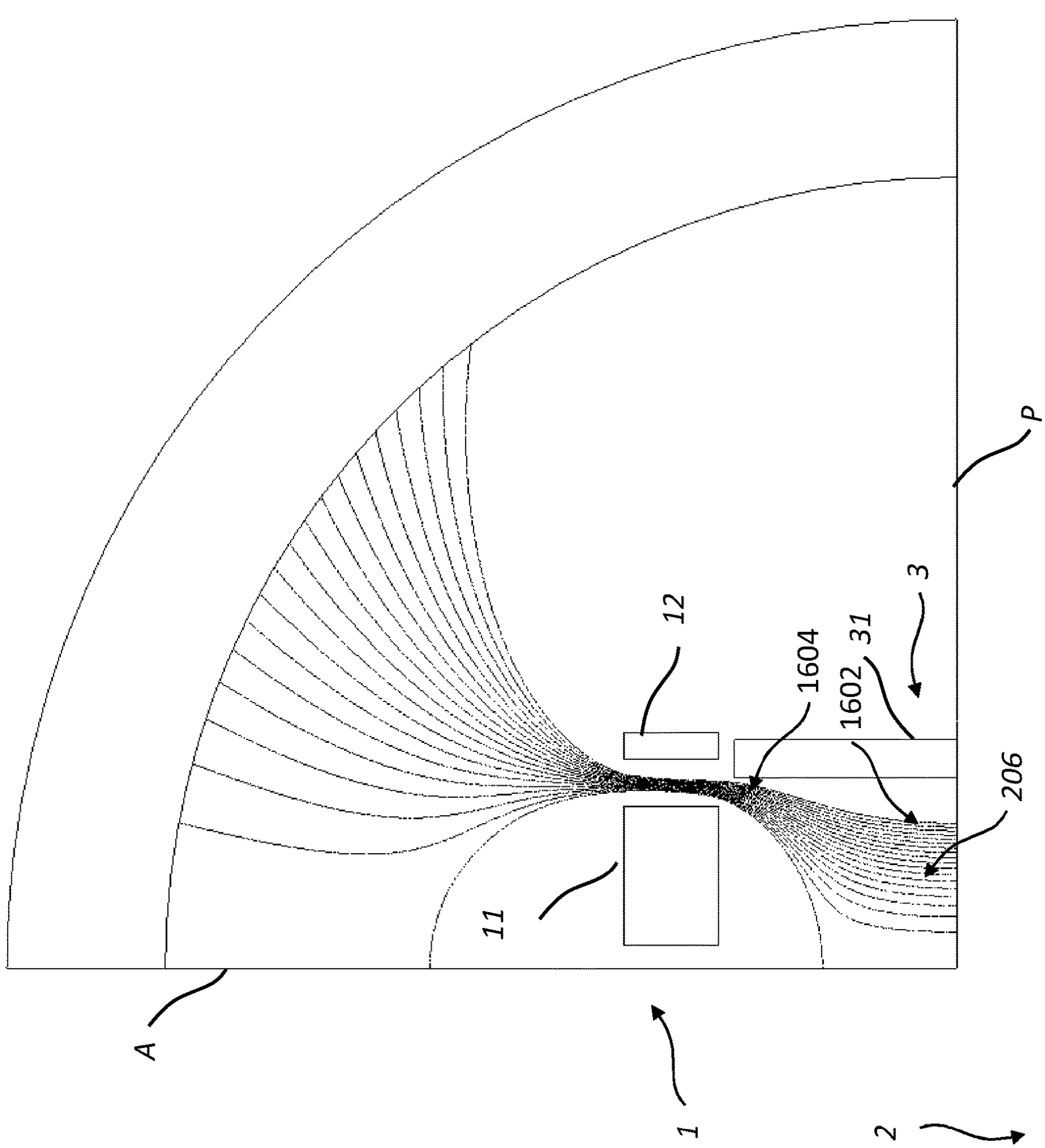
FIG. 11 is a planar view showing simulated magnetic field lines generated by first, second, and third magnet systems.

FIG. 11 shows yet another configuration that may be comprised in a plasma confinement device. In addition to the first magnet system 1 and the second magnet system 2 of FIG. 10, just as in FIGS. 3*a* and 3*b*, a third magnet system 3 is arranged radially outside the plasma confinement area 206. The third magnet system comprises a circular-loop coil 31.

Still with reference to FIG. 11, just as discussed above in conjunction with FIG. 9, the field configuration displaying a region 1602 of relatively low magnetic flux density near the symmetry plane P and a region 1604 of relatively high magnetic flux density near the coils 11, 12, creating a confinement area 206 for charged particles, based on the principle of magnetic reflection.

Moreover, still with reference to FIG. 11, just as in FIG. 10, as seen from radially outside the confinement area 206, i.e. from the right in FIG. 9, the region 1602 near the symmetry plane displays concave magnetic field lines, as seen from outside the plasma confinement area 206, while the region 1604 displays convex magnetic field lines, again as seen from outside the plasma confinement area 206. However, the region of concave magnetic field lines is larger than with the configuration of FIG. 10, corresponding to a majority of the plasma confinement area.

Moreover, still with reference to FIG. 11, just as in FIG. 10, an appropriate choice of the geometry of the coils and the currents running therein, allows for a considerably increased magnetic flux density in the region 1604 of relatively high magnetic flux density near the coils 11, 12, providing for a high mirror ratio.

Furthermore, as evident from FIG. 11 (and FIGS. 4*a* and 4*b*), through an appropriate choice of the current through the coil 31 of the third magnet system, a field configuration is achievable with a radially strictly increasing magnetic flux density in the plasma confinement area 206.

Figure 12:
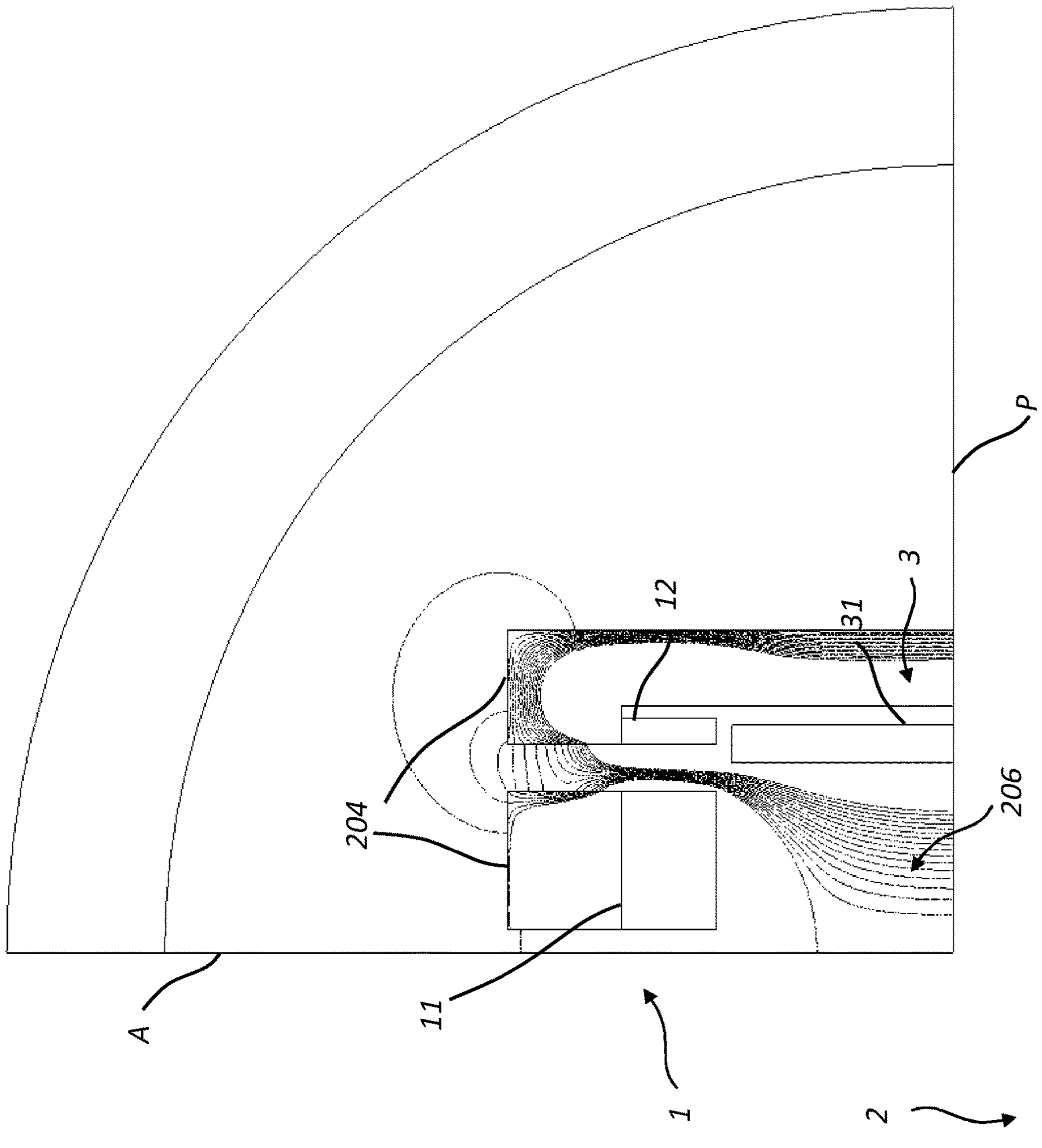
FIG. 12 is a planar view showing simulated magnetic field lines generated by first, second, and third magnet systems, each of the respective coils in the first magnet system and the second magnet system being embedded in respective ferromagnetic shielding.

FIG. 12, shows yet another configuration that may be comprised in a plasma confinement device. In addition to the configuration of FIG. 11, each of the respective coils in the first magnet system 1 and the second magnet system 2 is embedded in respective ferromagnetic shielding. This focuses the magnetic field, allowing for a higher mirror ratio.

Figure 13:
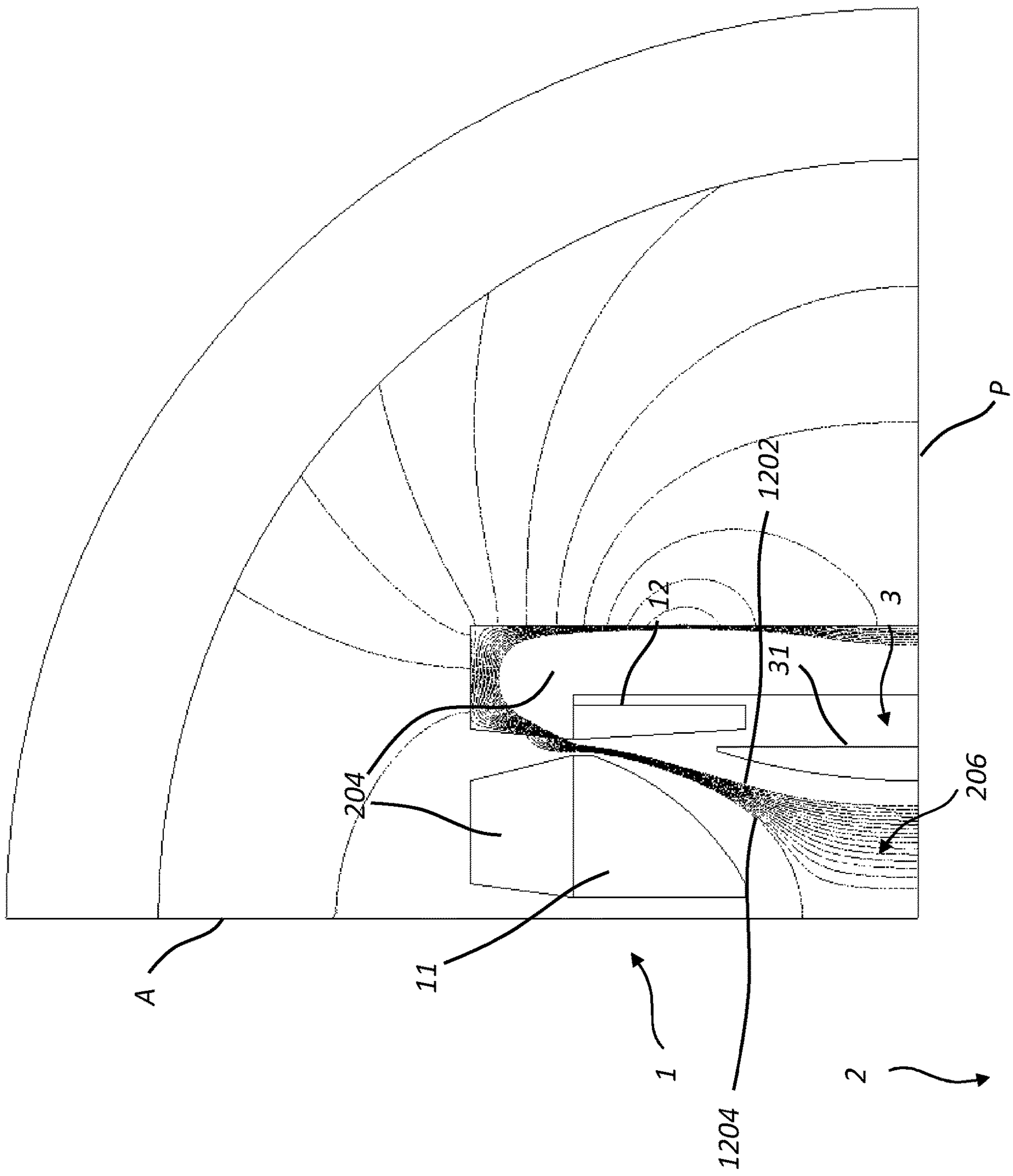
FIG. 13 is a planar view showing simulated magnetic field lines generated by first, second, and third magnet systems.

FIG. 13, shows yet another configuration that may be comprised in a plasma confinement device. In this example configuration, as compared to the configuration of FIG. 12, the coils 11, 12, 31 have tapered and/or convex surfaces. Hereby, as evident from FIG. 13, a magnetic field configuration is achievable where the radial outside perimeter 1202 of the plasma confinement area 260, all the way up a reflection point, has concave magnetic field lines, and also the radially inside perimeter 1204 while the magnetic flux density is radially strictly increasing.

FIGS. 5*a* and 5*b* each show a plasma confinement device 500, each comprising a first 1 and a second 2 magnet system as detailed above in conjunction with FIGS. 1*a*, 1*b*, 1*c*, and 2 and an optional third magnet system 3, as detailed above in conjunction with FIGS. 3*a*, 3*b*, 4*a*, and 4*b*. Each such plasma confinement device 500 may be used in a fusion reactor.

Further, each plasma confinement device 500 comprises a plasma vessel 208, as well-known per se in plasma fusion technology. The plasma vessel may, as shown be located between the first magnet system 1 and the second magnet system 2. Further, the plasma vessel 208 may, as shown, be located radially inside the third magnet system 3, if such a system is present. The plasma vessel 208, may as shown, be rotationally symmetric around the axis A. The reactor vessel 208 is located so that the annular, toroid-shaped, plasma confinement area 206 is located inside the reactor vessel 208.

Physical dimensions of the plasma confinement device 500 depend on many parameters such as engineering current density in the magnetic coils, the degree of confinement of alpha particles, the desired plasma volume, etc. Below follow typical dimensions that may provide good confinement of alpha particles and a plasma volume of roughly 15 $m^3$ at an engineering current density in the magnet systems of 10 $A/mm^2$:

Outer diameter the first magnet system 1 and the second magnet system 2: 8 m-16 m, typically 12 m.

Height of each of the coils 11, 12, 21, 22: 1.5 m-3.5 m, typically 2.5 m

Thickness of the core 204 embedding coils: 0.6 m-1.3 m, typically 1.0 m.

Distance between the upper edge of the first magnet system 1 and the lower edge of the second magnet system 2: 4.0 m-8.0 m, typically 6.0 m Outer diameter of the third magnet system 3: 10.0 m-22 m, typically 16.0 m.

By varying the coil current or coil current the magnetic field configuration may be changed as to control a plasma confined in the plasma confinement area 206. For example, the radius of the plasma confinement area may be changed.

FIG. 5*b* shows a plasma confinement device 500 having an optional microwave plasma heating device 210, as known per se, located at the center of the device 500 at the axis A, and thus radially inside of the plasma confinement area 206.

Further, the plasma confinement device 500 may have an optional ion beam insertion arrangement 212, as known per se, leading into the vessel 208 and being located radially outside the plasma confinement area 206.

An ion beam, for example comprising high-energy alpha particles, may be inserted using the ion beam insertion device 210 in an area radially outside the plasma confinement area 206, after which ions from the ion beam may be allowed to drift towards lower radius into the plasma confinement area 206, thereby heating the plasma, which may in the next phase be self-sustaining in heating, i.e. ignited plasma.

Alternatively (not shown) an ion beam, for example comprising high-energy alpha particles, may be inserted using such an ion beam insertion device in an area radially inside the plasma confinement area 206, after which ions from the ion beam may be allowed to drift towards higher radius into the plasma confinement area 206, thereby heating the plasma.

Thus, the plasma confinement device design according to the present disclosure allows accessibility for heating devises both at the outer radius and at the center of the system.

Alternatively, again, the plasma may be heated by the microwave plasma heating device 210.

Figure 6:
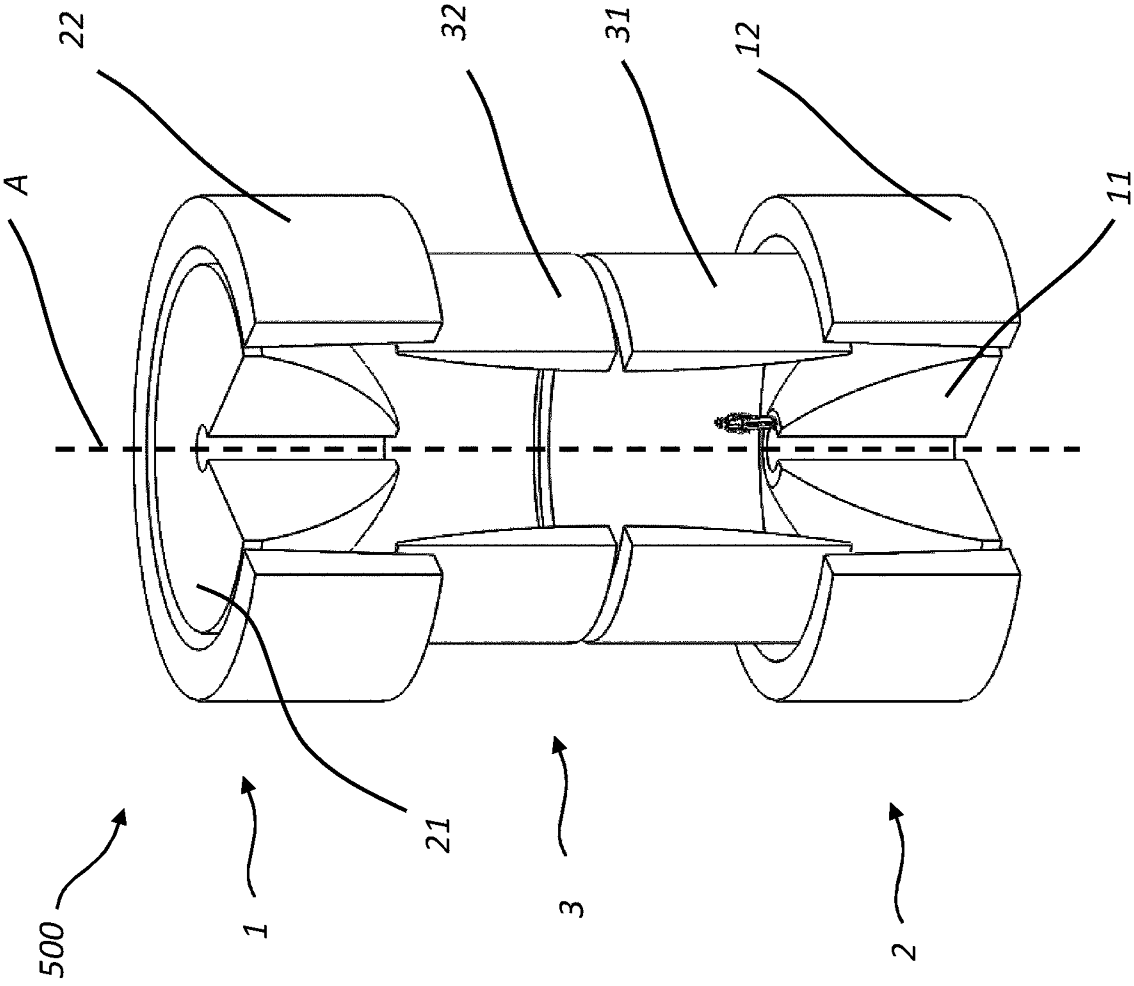
FIGS. 6, 7, and 8 are cut-out perspective views of a plasma confinement device.
Figure 7:
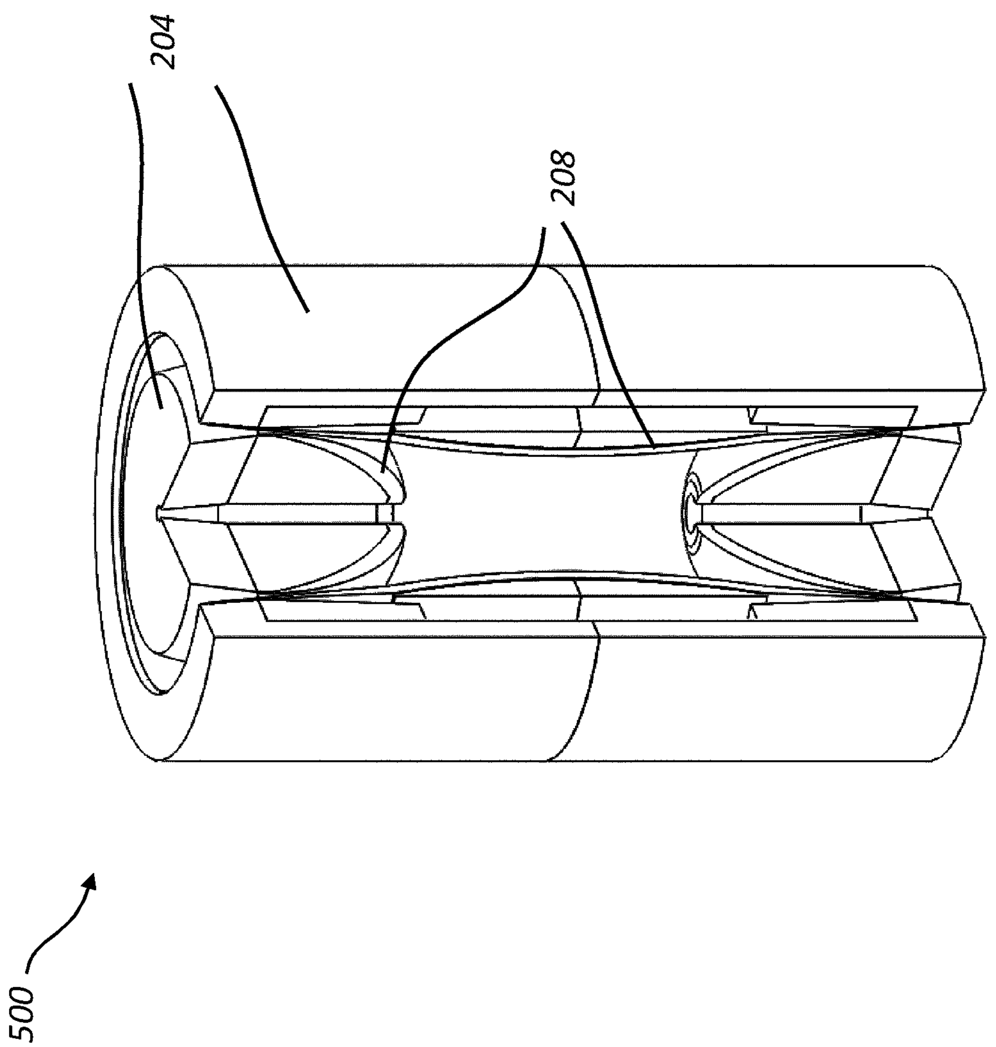
Figure 8:
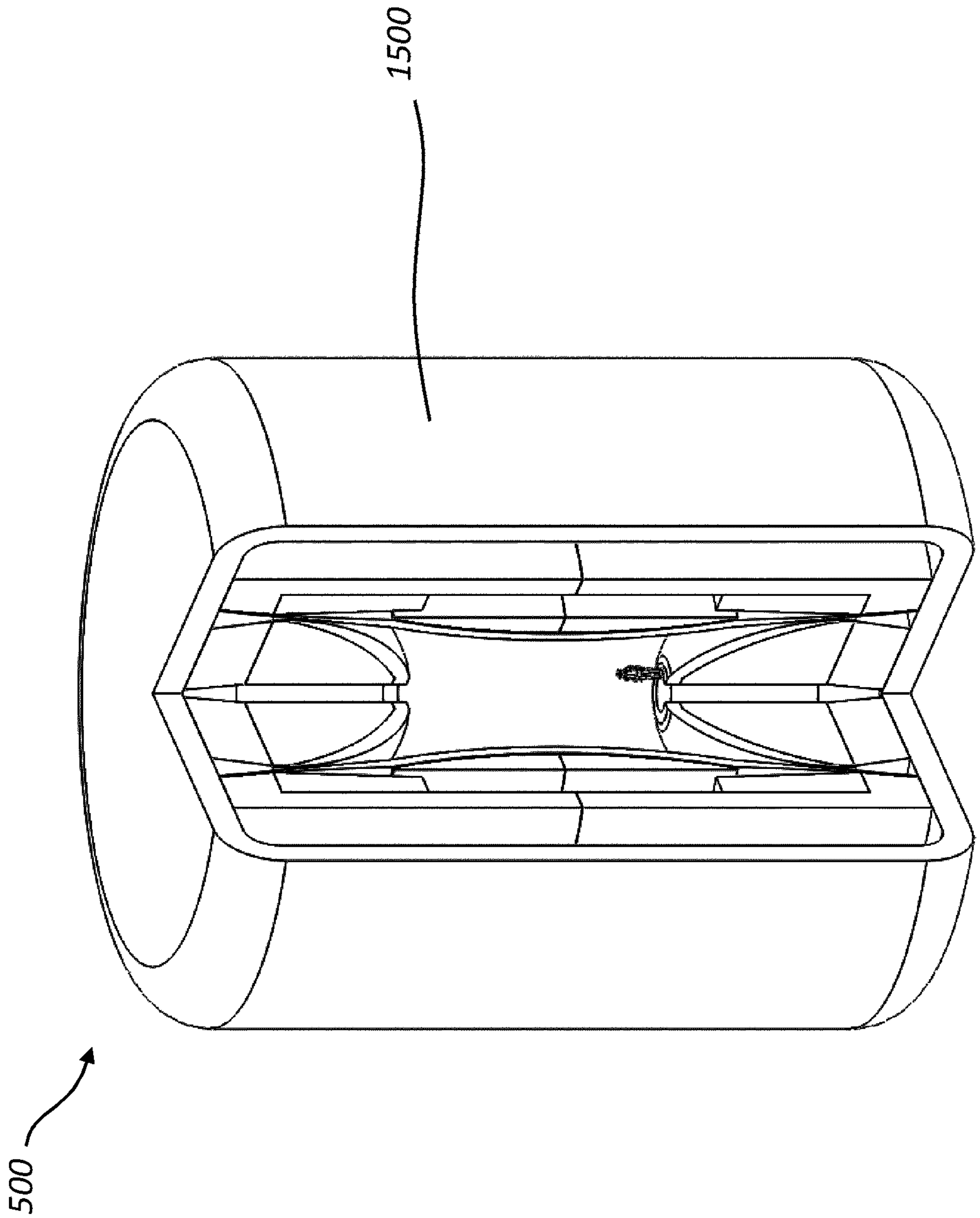

FIGS. 6, 7, and 8 are cut-out perspective views of another plasma confinement device 500 comprising a first 1 a second 2, and a third 3 magnet system as detailed above in conjunction with FIG. 13. The plasma confinement device 500 may be used in a fusion reactor.

Further, as shown in FIG. 7 the plasma confinement device 500 may comprise a plasma vessel 208, as well-known per se in plasma fusion technology. As shown, a plasma vessel 208 may be located radially inside the coils 31, 32 of the third magnet system 3, radially inside the outer coils 22, 12 of, respectively, the first magnet system 1 and the second magnet system 2, and radially outside and axially inside the inner coils 11, 21 of, respectively, the first magnet system 1 and the second magnet system 2.

Further, FIG. 7 shows the ferromagnetic embedding 204.

Finally, FIG. 8 shoes the plasma confinement device 500 being contained in a housing 1500.

Typical dimensions may be as follows. Including the housing 1500, the device 500 may have diameter of about 25 m and a height of about 35 m. The inner diameter of the coils of the third magnet system 3 may be about 12 m. The minimal distance between the inner coils 11, 21 of, respectively, the first magnet system 1 and the second magnet system 2, may be about 11 m.

According to the present disclosure, the overall current in a system of particles, i.e., plasma, confined therein may be zero, or close to zero. This may result in a much less dynamic plasma compared to the toroidal based reactors, such as tokamaks. Such a less dynamic plasma may have less problems with current-driven plasma instabilities, such as kink instability.

In the following, simulation results for a plasma confinement device according to the present inventive concept will be discussed, with reference to FIGS. 14*a*, 14*b*, 15, 16, and 17, validating the ability of the plasma confinement device 500 to confine fusion plasma ions. Confining a fusion plasma implies confining deuterium ions, tritium ions, alpha particles, and electrons by the magnetic field in the plasma volume. Alpha particles, one of the products of deuterium-tritium fusion, with a kinetic energy of 3.5 MeV (around 13.000.000 m/s) are by far the hardest particles to confine.

If an alpha particle can be confined, it will contribute to the heating of the plasma so that an ignited plasma is self-sustained by confined alpha particles. Burning plasma needs external energy, but less than the heating energy produced by the fusion process. Such heating is provided by fusion-product alpha-particles. Thus, confining alpha particles is important.

Deuterium and tritium will fuse at 12 keV or even lower. To confine a lighter ion at a lower energy is much easier than the heavy ion at high energy. If fusion-product alpha particles may be confined, deuterium and tritium ions as well as the electrons will also be confined in the same volume, i.e., if the alpha particles are confined, deuterium and tritium ions will also be confined.

Simulations were performed of trajectories of charged particles with in a magnetic field computed by finite element method (FEM) simulation, verifying the capability of charged particle confinement.

Since the system is rotationally symmetric, it could be described in a two-dimensional (2D) simulation. Furthermore, since there is mirror symmetry between the two first magnet system and the second magnet system, a first quadrant (cf. FIGS. 4*b*, 9-13) could fully define the whole volume of the system.

Particle trajectories were calculated iteratively, taking into account the Lorentz force on the particle and Newton's second law.

FIGS. 14*a*, 14*b*, 15, 16, and 17 show one-particle simulation results in the configuration discussed above in conjunction with FIGS. 6, 7, 8, and 13.

Figure 14B:
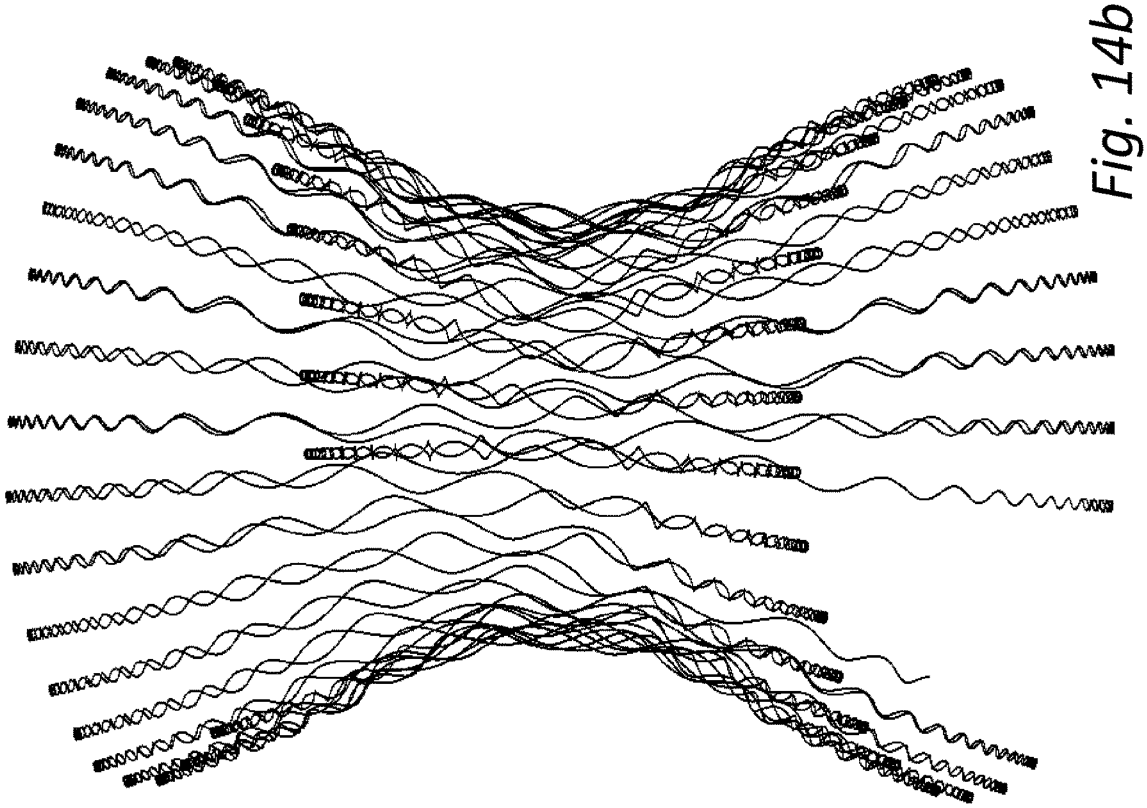
FIGS. 14*a* and 14*b* show one-particle simulation results in the configuration of FIGS. 6, 7, 8, and 13.
Figure 14A:
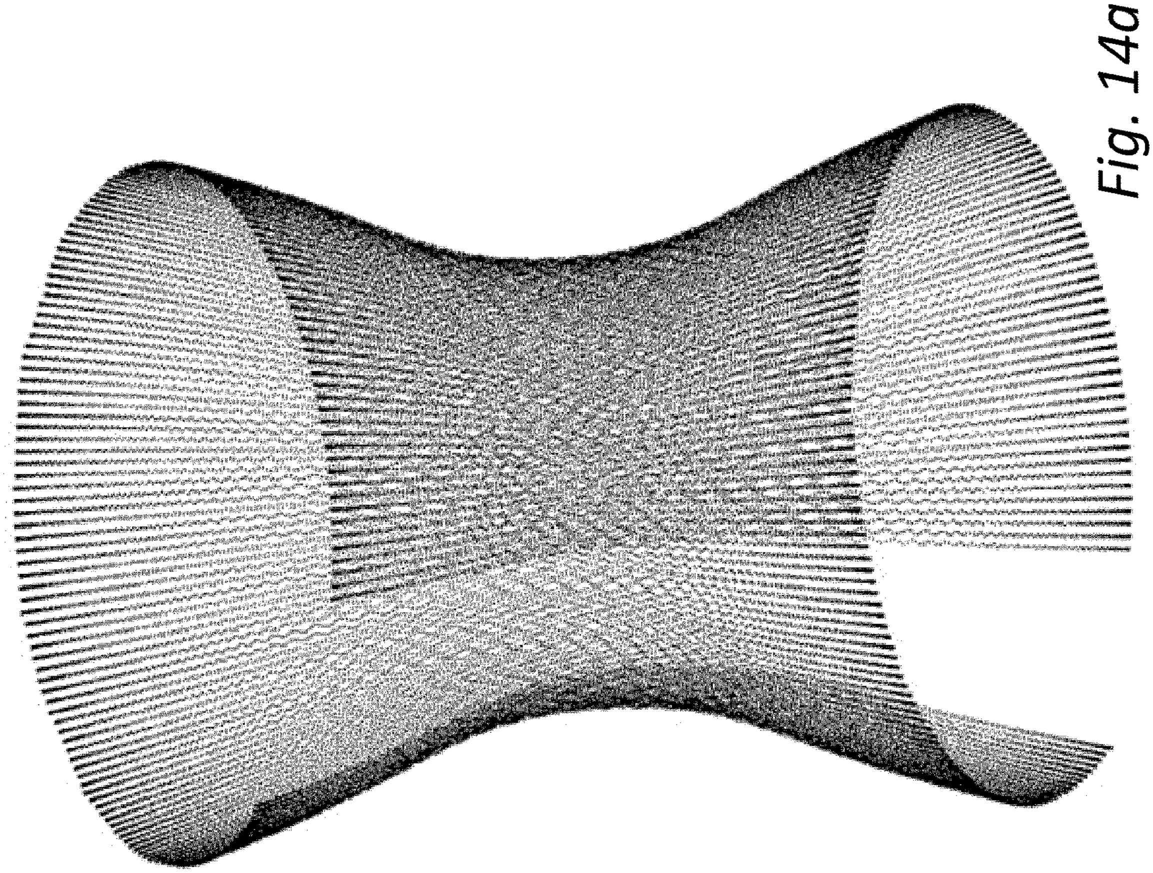

FIG. 14*a* shows the simulated path of a deuteron with a kinetic energy of 100 keV, while FIG. 14*b* shows the simulated path of an alpha particle with a kinetic energy of 3.5 MeV, i.e., as typical as a product from a fusion between a deuterium ion and a tritium ion. Both particles are confined in the plasma confinement area, being magnetically reflected at respective endpoints. To a first approximation, for a given initial velocity vector, the gyrocenter of the charged particles will follow a given field line and be reflected at the same endpoint regardless of the particle kinetic energy or charge. However, since the particles will different gyro spin radii (Larmor radius), the drift will be different.

Figure 15:
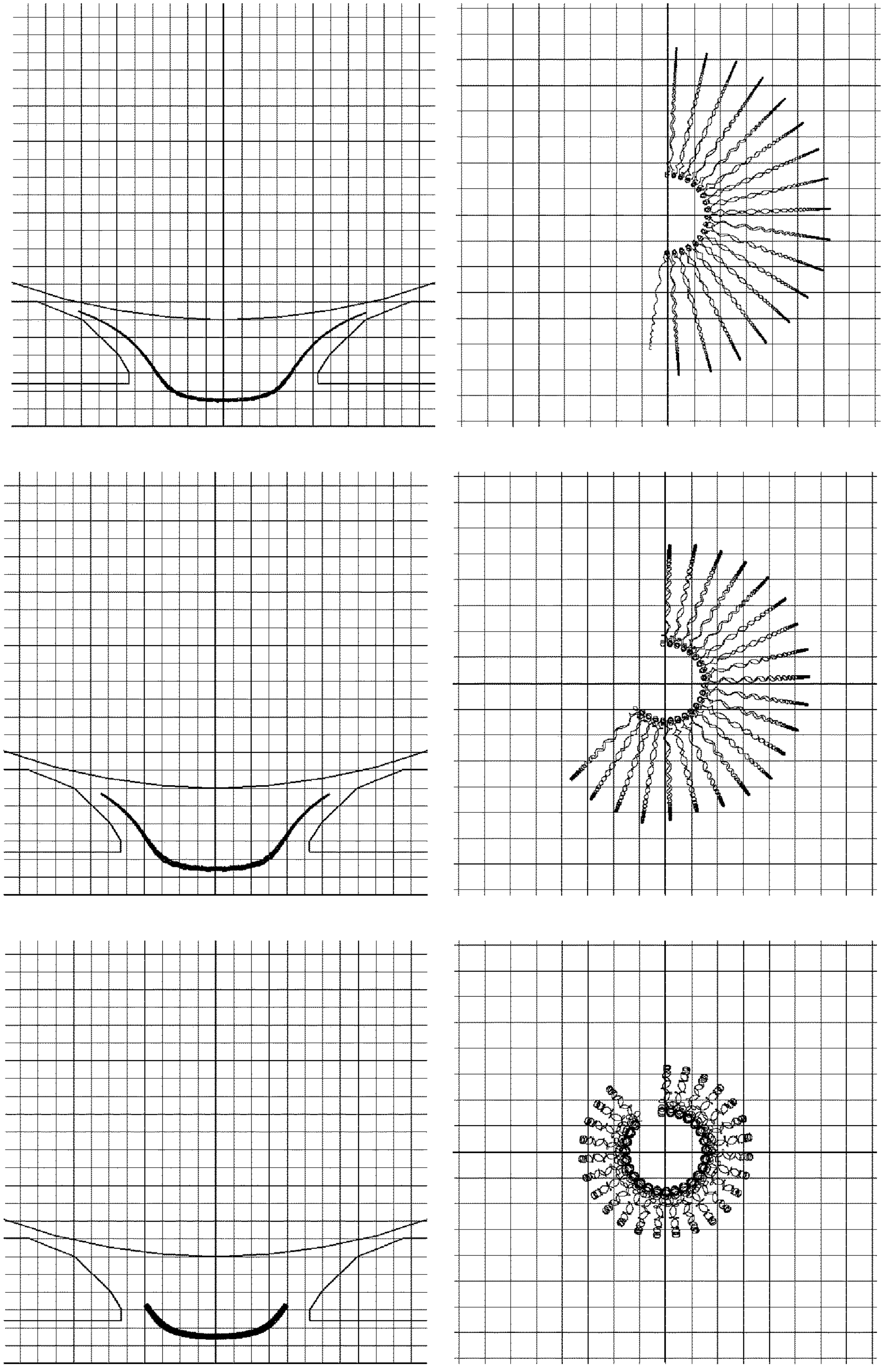
FIGS. 15, 16, and 17 show, respectively, simulated charged particle trajectories with initial radial positions of 1.5 m, 3.0 m, and 4.5 m, each for $v_Z/v_R$ ratios of 0.5, 1.5, 2.5.
Figure 16:
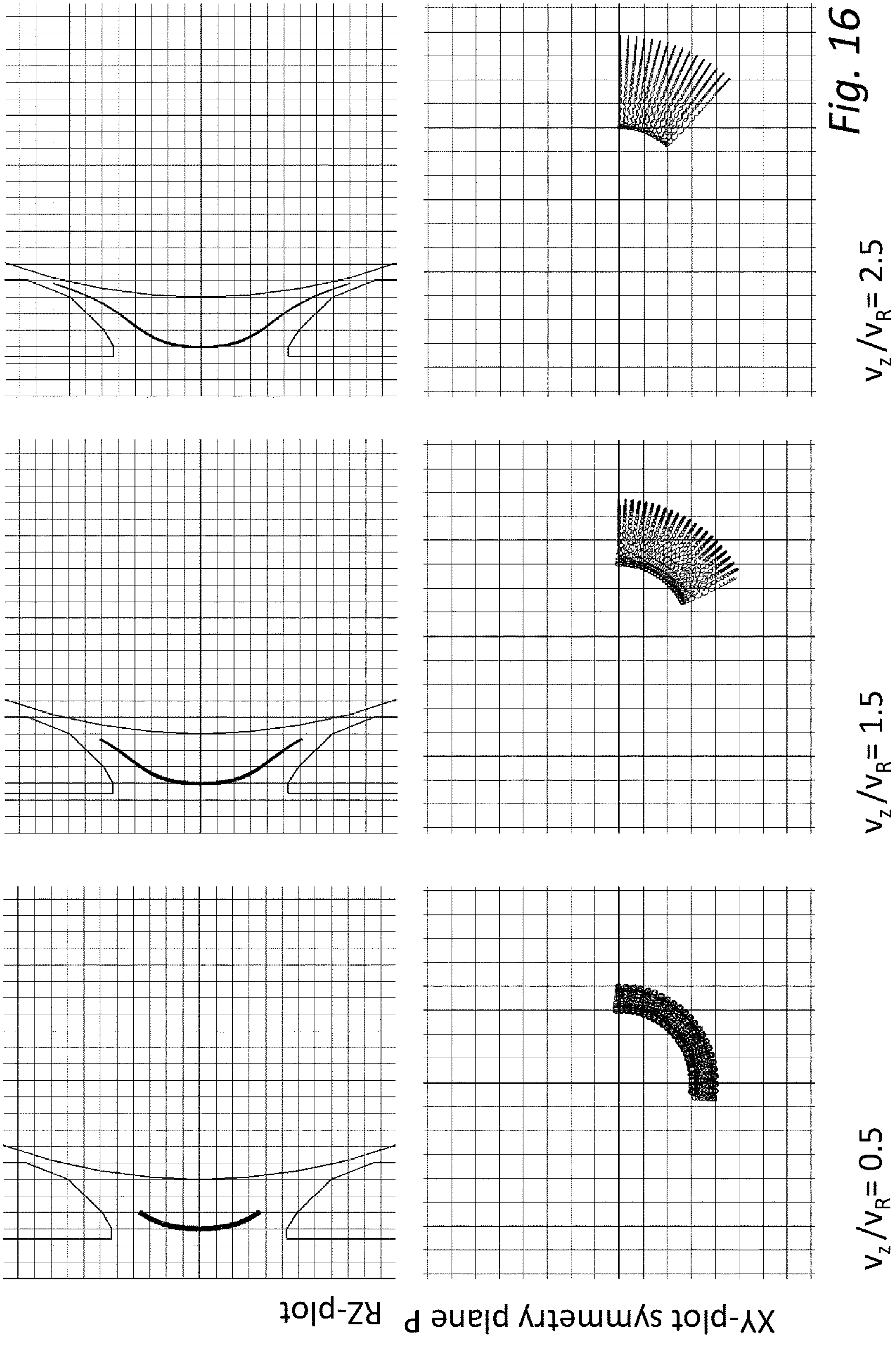
Figure 17:
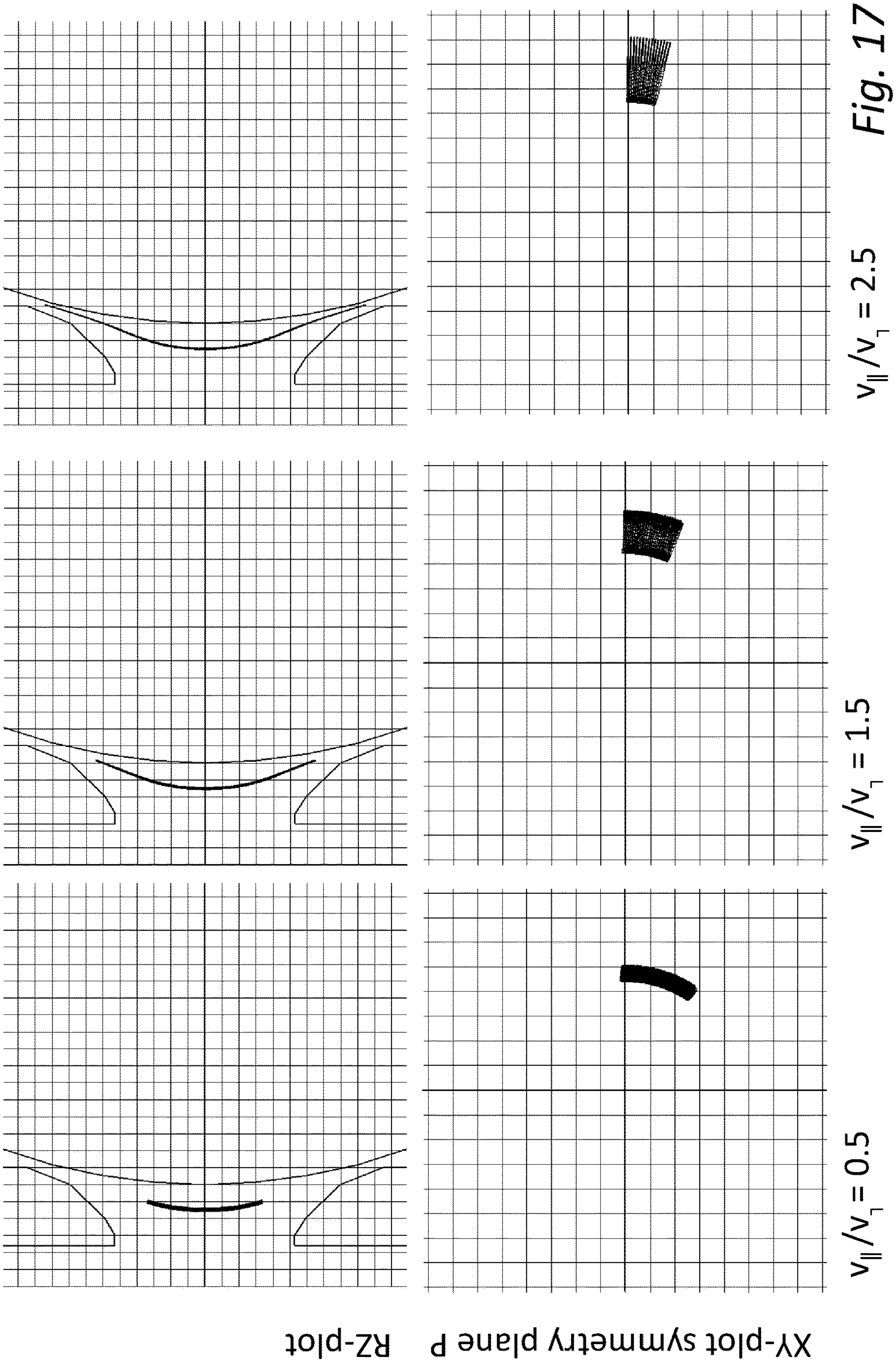

FIGS. 15, 16, and 17 show, respectively, simulated charged particle trajectories with initial radial positions of 1.5 m, 3.0 m, and 4.5 m, each for $v_Z/v_R$ (axial velocity to radial velocity) ratios of 0.5, 1.5, 2.5, showing confinement of charged particles for each of these configurations.

The inventive concept has mainly been described above with reference to example embodiments. However, as is readily appreciated by a person skilled in the art, other embodiments than the ones disclosed above are equally possible within the scope of the inventive concept, as defined by the appended patent claims.

The following are examples forming part of the description.

1. A plasma confinement device (500), comprising:
   - a first magnet system (1) comprising a first plurality of concentrically arranged circular-loop coils (11, 12), comprising:
     - a first coil (11) arranged to carry a current in a first direction; and
     - a second coil (12) arranged to carry a current in a second direction opposite to said first direction; and
   - a second magnet system (2) comprising a second plurality of concentrically arranged circular-loop coils (21, 22), arranged with mirror symmetry with respect to said first magnet system relative to a symmetry plane (P) located between said first magnet system (1) and said second magnet system (2), creating an annular plasma confinement area (206) at said symmetry plane (P) with a magnetic field normal to said symmetry plane (P) at said symmetry plane (P).

2. The device (500) of example 1, wherein said first plurality of concentrically arranged coils (11, 12) is identically designed to said second plurality of concentrically arranged coils (21, 22).

3. The device of any one of examples 1-2, further comprising a third magnet system (3) arranged radially outside said plasma confinement area (206), said third magnet system (3) comprising at least one circular-loop coil (31, 32).

4. The device (500) of example 3, wherein said third magnet system (3) comprises a first coil (31) arranged on a same side of said symmetry plane (P) as said first magnet system (1) and a second coil (32) arranged on an opposite side of said symmetry plane (P), wherein said second coil (32) is arranged with mirror symmetry relative to said first coil (31).

5. The device (500) of any one of examples 1-4, wherein said first plurality of concentrically arranged coils in said first magnet system and said second plurality of concentrically arranged coils in said second magnet system each are embedded in respective ferromagnetic structures.

6. The device (500) of example 5, wherein a said ferromagnetic structure does not cover at least one coil of a respective said plurality of coils in a direction towards said symmetry plane.

7. The device (500) of any one of examples 5-6, wherein a said ferromagnetic structure comprises ferromagnetic steel.

8. Use of the device (500) of any one of examples 1-7 for confining a plasma.

9. Use of the device (500) of any one of examples 1-7 in a fusion reactor.

10. A method of plasma confinement, comprising:

in a first magnet system (1) comprising a first plurality of concentrically arranged circular-loop coils (11, 12), a first coil (11) carrying a current in a first direction and a second coil (12) carrying a current in a second direction opposite to said first direction; and a second magnet system (2) comprising a second plurality of concentrically arranged circular-loop coils (21, 22) carrying currents with mirror symmetry with respect to said first magnet system (1) relative to a symmetry plane (P) located between said first magnet system (1) and said second magnet system (2), creating an annular plasma confinement area (206) at said symmetry plane (P) with a magnetic field normal to said symmetry plane (P).

11. The method of example 10, further comprising:

controlling a confined plasma by current adjustment in a third magnet system (3) arranged radially outside said plasma confinement area (206).

12. The method of example 11, wherein said controlling comprises changing a radius of said plasma confinement area.

13. The method of any one of examples 10-12, further comprising:

heating said plasma by inserting an ion beam in an area radially outside said plasma confinement area (206) or radially inside said plasma confinement area (206) and allowing ions from said ion beam to drift into said plasma confinement area (206).

The invention claimed is:

1. A magnetic mirror machine for plasma confinement, comprising a plurality of longitudinally disposed superconductor coils arranged for producing an open-field-line plasma confinement area, said plasma confinement area at each of two ends being limited by a respective mirror area of increased magnetic flux density relative to a central area of said plasma confinement area, wherein a superconductor coil of said plurality of superconductor coils is located adjacent to said mirror area and said superconductor coil has a cross-section, in a plane intersecting a magnetic field line through said mirror area, having an elongate shape in a direction along said magnetic field line, wherein at least one superconductor coil of said plurality of superconductor coils is embedded in a respective ferromagnetic shielding, thereby focusing magnetic flux in said mirror area and providing a higher mirror ratio relative to an absence of said ferromagnetic shielding.

2. The magnetic mirror machine of claim 1, wherein a perimeter segment of said cross-sectional area directed towards said mirror area is convex as seen from outside said perimeter segment.

3. The magnetic mirror machine of claim 1, wherein a perimeter segment of said cross-sectional area directed away from said mirror area is concave as seen from outside said perimeter segment.

4. The magnetic mirror machine of claim 1, wherein a perimeter segment of said cross-sectional area directed towards said mirror area runs parallel to a perimeter segment of said cross-sectional area directed away from said mirror area.

5. The magnetic mirror machine of claim 1, wherein said plurality of superconductor coils are disposed co-axially and longitudinally spaced and each arranged for carrying respective currents in a same direction.

6. The magnetic mirror machine of claim 1, wherein said plurality of superconductor coils comprises: a first magnet system comprising a first plurality of concentrically arranged circular-loop superconductor coils, comprising: a first superconductor coil arranged to carry a current in a first direction; and a second superconductor coil arranged to carry a current in a second direction opposite to said first direction; and a second magnet system comprising a second plurality of concentrically arranged circular-loop coils, arranged with mirror symmetry with respect to said first magnet system relative to a symmetry plane (P) located between said first magnet system and said second magnet system.

7. The magnetic mirror machine of claim 6, wherein said plurality of superconductor coils further comprises a third magnet system arranged radially outside said plasma confinement area, said third magnet system comprising at least one superconductor circular-loop coil.

8. A fusion reactor comprising the magnetic mirror machine of claim 1.

9. A method of plasma confinement, comprising use of the magnetic mirror machine of claim 1 for confining a plasma.

10. The method of claim 9, wherein the method is carried out in a fusion reactor.

* * * * *